(12) United States Patent
Wang et al.

(10) Patent No.: US 9,203,487 B2
(45) Date of Patent: Dec. 1, 2015

(54) METHOD AND DEVICE FOR INDICATING PILOT STATE

(71) Applicant: Huawei Technologies Co., Ltd., Shenzhen (CN)

(72) Inventors: Fan Wang, Kista (SE); Xueli Ma, Shanghai (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/666,150

(22) Filed: Mar. 23, 2015

(65) Prior Publication Data

US 2015/0195017 A1    Jul. 9, 2015

Related U.S. Application Data

(63) Continuation of application No. PCT/CN2013/070419, filed on Jan. 14, 2013.

(30) Foreign Application Priority Data

Sep. 26, 2012    (WO) ................ PCT/CN2012/082072

(51) Int. Cl.
*H04K 1/10* (2006.01)
*H04L 27/28* (2006.01)
*H04B 7/04* (2006.01)
*H04B 7/06* (2006.01)
*H04L 5/00* (2006.01)

(52) U.S. Cl.
CPC ............ *H04B 7/0417* (2013.01); *H04B 7/0413* (2013.01); *H04B 7/0626* (2013.01); *H04L 5/0048* (2013.01)

(58) Field of Classification Search
CPC .. H04B 7/0417; H04B 7/0626; H04B 7/0421; H04B 7/0413; H04L 5/0048; H04L 5/005; H04L 5/0051
USPC .......... 376/260, 346, 267, 299, 347; 370/329; 375/260, 346, 267, 299, 347
See application file for complete search history.

(56) References Cited

U.S. PATENT DOCUMENTS

2010/0234063 A1    9/2010    Mueck et al.
2010/0284357 A1    11/2010    Wilson et al.

(Continued)

FOREIGN PATENT DOCUMENTS

CN    101841348 A    9/2010
CN    102170330 A    8/2011

(Continued)

OTHER PUBLICATIONS

"RAN1 Chairman's Notes," 3GPP TSG RAN WG1 Meeting #70, Qingdao, China, 3rd Generation Partnership Project, Valbonne, France (Aug. 13-17, 2012).

(Continued)

*Primary Examiner* — Phuong Phu
(74) *Attorney, Agent, or Firm* — Leydig, Voit & Mayer, Ltd.

(57) ABSTRACT

The present invention discloses a method for indicating pilot state, a radio network controller. The method includes: acquiring, by an RNC, state information of a scheduled non-precoded pilot, where the state information of the scheduled non-precoded pilot indicates activated state or deactivated state of the scheduled non-precoded pilot; and sending, by the RNC, 4Tx MIMO mode configuration signaling to a UE, where the configuration signaling carries the state information of the scheduled non-precoded pilot, so that the UE acquires state of the scheduled non-precoded pilot according to the state information of the scheduled non-precoded pilot when being configured to 4Tx MIMO mode. The method for indicating pilot state and the radio network controller according to embodiments of the present invention can reduce physical-layer signaling overheads and reduce a delay in acquiring state of a scheduled non-precoded pilot by the UE in 4Tx MIMO mode.

9 Claims, 17 Drawing Sheets

(56) References Cited

U.S. PATENT DOCUMENTS

| | | |
|---|---|---|
| 2013/0072179 A1 | 3/2013 | Zhang et al. |
| 2013/0308553 A1* | 11/2013 | Cozzo et al. .................. 370/329 |
| 2014/0269617 A1 | 9/2014 | Huang |

FOREIGN PATENT DOCUMENTS

| | | |
|---|---|---|
| CN | 102264159 A | 11/2011 |
| CN | 102469588 A | 5/2012 |
| CN | 102791041 A | 11/2012 |

OTHER PUBLICATIONS

"Intial activation status of scheduled non-precoded pilots," 3GPP TSG-RAN Meeting #71, New Orleans, Louisiana, R1-125127, $3^{rd}$ Generation Partnership Project, Valbonne, France (Nov. 12-16, 2012).

* cited by examiner

100

200

300

| A user equipment UE receives first 4Tx multi-input multi-output MIMO mode configuration signaling sent by a radio network controller RNC, where the configuration signaling carries state information that is of a scheduled non-precoded pilot and received by the RNC from a base station, and the state information of the scheduled non-precoded pilot indicates activated state or deactivated state of the scheduled non-precoded pilot | S310 |

| The UE acquires state of the scheduled non-precoded pilot according to the state information of the scheduled non-precoded pilot when being configured to 4Tx MIMO mode according to the configuration signaling | S320 |

FIG. 7

METHOD AND DEVICE FOR INDICATING PILOT STATE

CROSS-REFERENCE TO RELATED APPLICATION

This application is a continuation of International Patent Application No. PCT/CN2013/070419, filed on Jan. 14, 2013, which claims priority to International Application No. PCT/CN2012/082072, filed on Sep. 26, 2012, all of which are hereby incorporated by reference in their entireties.

TECHNICAL FIELD

The present invention relates to the field of communications, and in particular, to a method for indicating pilot state, a radio network controller, a base station, a user equipment, and a system.

BACKGROUND

Wideband Code Division Multiple Access (Wideband Code Division Multiple Access, "WCDMA" for short) is a radio communications technology developed by the 3rd Generation Partnership Project (3rd Generation Partnership Project, "3GPP" for short). This technology is now put into wide use and keeps evolving over time. In the WCDMA Rel-5 and a later release, a high speed packet access (High Speed Packet Access, "HSPA" for short) technology is introduced to support higher-speed data service transmission. Currently, the HSPA is evolving towards HSPA+, to provide support for a higher-order multi-input multi-output (Multiple Input Multiple Output, "MIMO") technology and key technologies such as aggregation of more carriers.

A new project was initiated at the $53^{rd}$ conference of the 3GPP radio access network (Radio Access Network, "RAN" for short) to discuss downlink 4-antenna MIMO with the purpose of further improving a cell throughput. In a downlink 2Tx MIMO system that is already supported, a primary common pilot channel (Primary Common Pilot Channel, "P-CPICH" for short) and a secondary common pilot channel (Secondary Common Pilot Channel, "S-CPICH" for short) are used to support channel state information (Channel Status Information, "CSI") estimation and data demodulation. In downlink 4Tx MIMO, more S-CPICH channels may be supported to perform CSI estimation; and a scheduled non-precoded pilot (Scheduled non-precoded pilot, which is also called a scheduled pilot or a demodulated common pilot) is supported to perform data demodulation. The scheduled non-precoded pilot is sent only at the time of data transmission. Power of the scheduled non-precoded pilot is generally higher than that of a common pilot sent on an antenna 3 and an antenna 4, which helps a user equipment (User Equipment, "UE" for short) to perform more accurate channel estimation by using the scheduled non-precoded pilot, and therefore obtain better data demodulation performance.

There are times when scheduled non-precoded pilot is of little help to enhancing performance of a 4Tx MIMO UE, for example, when a signal to interference plus noise ratio (Signal to Interference plus Noise Ratio, "SINR" for short) of the UE is relatively low; therefore, in this case, the scheduled non-precoded pilot may not be sent, so as to reduce interference to other UEs. Especially, for a terminal incapable of 4Tx MIMO, the scheduled non-precoded pilot is nothing but interference to the terminal, and performance of the terminal can be improved to some extent if the scheduled non-precoded pilot is not sent.

It is agreed by the 3GPP standards body that the scheduled non-precoded pilot may be activated or deactivated by using shared control channel for high speed downlink shared channel (Shared Control Channel for High Speed Downlink Shared Channel, "HS-SCCH" for short) signaling. On a network, if it is determined, for example, according to the fact that a 4Tx MIMO UE has a relatively low signal-to-noise ratio, that the scheduled non-precoded pilot may not be sent, the scheduled non-precoded pilot may be deactivated by using the HS-SCCH signaling; conversely, if it is determined that the scheduled non-precoded pilot needs to be sent, the scheduled non-precoded pilot may be activated by using the HS-SCCH signaling.

At present, when downlink 4Tx MIMO is configured for a cell, a UE initially does not know whether the scheduled non-precoded pilot is activated or deactivated. It may be beneficial for the UE to learn whether the scheduled non-precoded pilot is activated or deactivated, because by doing so, the UE can use the scheduled non-precoded pilot, if present, to improve precision of 4Tx MIMO data detection. Whether the scheduled non-precoded pilot is activated is decided by a base station, and is a typical cell-level parameter, and may be determined according to conditions of multiple UEs. Therefore, when a UE is configured to operate in a downlink MIMO state by a radio network controller (Radio Network Controller, "RNC" for short), the scheduled non-precoded pilot may be either activated or deactivated.

A UE cannot determine, according to an actual state of a base station, whether the scheduled non-precoded pilot is in an activated or deactivated state. Almost each time when downlink 4Tx MIMO is configured for a UE, a base station needs to send HS-SCCH signaling to notify the UE of scheduled non-precoded pilot state, either activated or deactivated. Therefore, a large amount of HS-SCCH signaling is required to perform such function, which increases overheads of physical-layer dynamic signaling. In addition, after sending the HS-SCCH signaling, the base station needs to wait for the UE to send an acknowledgment (Acknowledgment, "ACK" for short) before sending scheduling data to the 4Tx MIMO UE, which results in a scheduling delay.

SUMMARY

Embodiments of the present invention provide a method for indicating pilot state, a radio network controller, a base station, a user equipment, and a system, which can reduce physical-layer signaling overheads.

According to a first aspect, a method for indicating pilot state is provided and includes: acquiring, by a radio network controller RNC, state information of a scheduled non-precoded pilot, where the state information of the scheduled non-precoded pilot indicates activated state or deactivated state of the scheduled non-precoded pilot; and sending, by the RNC, first 4Tx multi-input multi-output MIMO mode configuration signaling to a user equipment UE, where the first 4Tx MIMO mode configuration signaling carries the state information of the scheduled non-precoded pilot, so that the UE acquires state of the scheduled non-precoded pilot according to the state information of the scheduled non-precoded pilot when being configured to 4Tx MIMO mode.

In a first possible implementation, the RNC is a serving radio network controller SRNC, and the acquiring, by an RNC, state information of a scheduled non-precoded pilot includes: receiving, by the SRNC, the state information of the scheduled non-precoded pilot from a base station; or, receiving, by the SRNC, the state information of the scheduled non-precoded pilot from a drift radio network controller DRNC, where the state information of the scheduled non-precoded pilot is acquired by the DRNC from state information of the scheduled non-precoded pilot sent by a base station.

In a second possible implementation, the RNC is a serving radio network controller SRNC, and the acquiring, by an RNC, state information of a scheduled non-precoded pilot includes: sending, by the SRNC, second 4Tx MIMO mode configuration signaling to a base station; and receiving, by the SRNC, a response message of the second 4Tx MIMO mode configuration signaling from the base station, where the response message of the second 4Tx MIMO mode configuration signaling includes the state information of the scheduled non-precoded pilot.

In a third possible implementation, the RNC is a serving radio network controller SRNC, and the acquiring, by an RNC, state information of a scheduled non-precoded pilot includes: sending, by the SRNC, second 4Tx MIMO mode configuration signaling to a drift radio network controller DRNC, so that the DRNC sends third 4Tx MIMO mode configuration signaling to a base station; and receiving, by the SRNC, a response message of the second 4Tx MIMO mode configuration signaling from the DRNC, where the response message of the second 4Tx MIMO mode configuration signaling includes the state information of the scheduled non-precoded pilot, where the state information of the scheduled non-precoded pilot included in the response message of the second 4Tx MIMO mode configuration signaling is acquired by the DRNC from a response message sent by the base station in response to the third 4Tx MIMO mode configuration signaling.

In a fourth possible implementation, the RNC is a serving radio network controller SRNC, and the acquiring, by an RNC, state information of a scheduled non-precoded pilot includes: sending, by the SRNC, second 4Tx MIMO mode configuration signaling to a drift radio network controller DRNC; and receiving, by the SRNC, a response message of the second 4Tx MIMO mode configuration signaling from the DRNC, where the response message of the second 4Tx MIMO mode configuration signaling includes the state information of the scheduled non-precoded pilot, where the state information of the scheduled non-precoded pilot is acquired by the DRNC from state information of the scheduled non-precoded pilot sent by a base station.

With reference to the first possible implementation of the first aspect or the fourth possible implementation of the first aspect, in a fifth possible implementation, the RNC is a serving radio network controller SRNC, and the state information of the scheduled non-precoded pilot sent by the base station is included in a resource state indication message sent by the base station.

With reference to the fifth possible implementation of the first aspect, in a sixth possible implementation, the state information of the scheduled non-precoded pilot sent by the base station is state information of the scheduled non-precoded pilot sent after the base station changes state of the scheduled non-precoded pilot.

With reference to the second possible implementation of the first aspect or the third possible implementation of the first aspect or the fourth possible implementation of the first aspect, in a seventh possible implementation, the second 4Tx MIMO mode configuration signaling is included in a radio link setup message or a radio link addition message or a radio link reconfiguration request message or a radio link reconfiguration prepare message.

With reference to the second possible implementation of the first aspect or the third possible implementation of the first aspect or the fourth possible implementation of the first aspect, in an eighth possible implementation, the response message of the second 4Tx MIMO mode configuration signaling is included in a radio link setup response message or a radio link addition response message or a radio link reconfiguration response message or a radio link reconfiguration ready message.

According to a second aspect, a method for indicating pilot state is provided and includes: sending, by a base station, state information of a scheduled non-precoded pilot to a radio network controller RNC, where the state information of the scheduled non-precoded pilot indicates activated state or deactivated state of the scheduled non-precoded pilot, so that the RNC sends, to a first user equipment UE, first 4Tx multi-input multi-output MIMO mode configuration signaling that carries the state information of the scheduled non-precoded pilot, and the first UE acquires state of the scheduled non-precoded pilot according to the state information of the scheduled non-precoded pilot when being configured to 4Tx MIMO mode.

In a first possible implementation, the RNC is a serving radio network controller SRNC, and the sending, by a base station, state information of a scheduled non-precoded pilot to an RNC includes: sending, by the base station, the state information of the scheduled non-precoded pilot to the SRNC directly; or sending, by the base station, the state information of the scheduled non-precoded pilot to the SRNC through a drift radio network controller DRNC.

In a second possible implementation, the RNC is a serving radio network controller SRNC, and the method further includes: receiving, by the base station, second 4Tx MIMO mode configuration signaling sent by the SRNC; where the sending, by a base station, state information of a scheduled non-precoded pilot to an RNC includes: sending, by the base station, a response message of the second 4Tx MIMO mode configuration signaling to the SRNC, where the response message includes the state information of the scheduled non-precoded pilot.

In a third possible implementation, the RNC is a serving radio network controller SRNC, and the sending, by a base station, state information of a scheduled non-precoded pilot to an RNC includes: sending, by the base station, the state information of the scheduled non-precoded pilot to a drift radio network controller DRNC, so that after the DRNC receives second 4Tx MIMO mode configuration signaling sent by the SRNC, the DRNC sends a response message of the second 4Tx MIMO mode configuration signaling to the SRNC, where the response message includes the state information of the scheduled non-precoded pilot, and the state information of the scheduled non-precoded pilot included in the response message is acquired by the DRNC from the state information of the scheduled non-precoded pilot sent by the base station.

In a fourth possible implementation, the RNC is a serving radio network controller SRNC, and the method further includes: receiving, by the base station, third 4Tx MIMO mode configuration signaling sent by a drift radio network controller DRNC, where the third 4Tx MIMO mode configuration signaling is sent after the DRNC receives second 4Tx MIMO mode configuration signaling sent by the SRNC; where the sending, by a base station, state information of a scheduled non-precoded pilot to an RNC includes: sending, by the base station, a response message of the third 4Tx MIMO mode configuration signaling to the DRNC, so that the DRNC sends a response message of the second 4Tx MIMO mode configuration signaling to the SRNC, where both the response message of the second 4Tx MIMO mode configuration signaling and the response message of the third 4Tx MIMO mode configuration signaling include the state information of the scheduled non-precoded pilot, where the state information of the scheduled non-precoded pilot included in the response message of the second 4Tx MIMO mode configuration signaling is acquired by the DRNC from the response message of the third 4Tx MIMO mode configuration signaling.

With reference to the first possible implementation of the second aspect or the third possible implementation of the second aspect, in a fifth possible implementation, the base station sends the state information of the scheduled non-precoded pilot after changing state of the scheduled non-precoded pilot.

With reference to the first possible implementation of the second aspect or the third possible implementation of the second aspect, in a sixth possible implementation, the state information of the scheduled non-precoded pilot sent by the base station is included in a resource state indication message sent by the base station.

With reference to the second possible implementation of the second aspect or the third possible implementation of the second aspect or the fourth possible implementation of the second aspect, In a seventh possible implementation, the second 4Tx MIMO mode configuration signaling is included in a radio link setup message or a radio link addition message or a radio link reconfiguration request message or a radio link reconfiguration prepare message.

With reference to the second possible implementation of the second aspect or the third possible implementation of the second aspect or the fourth possible implementation of the second aspect, in an eighth possible implementation, the response message of the second 4Tx MIMO mode configuration signaling is included in a radio link setup response message or a radio link addition response message or a radio link reconfiguration response message or a radio link reconfiguration ready message.

In a ninth possible implementation, before the sending, by a base station, state information of a scheduled non-precoded pilot to the RNC, the method further includes: notifying, by the base station, a second UE to change state of the scheduled non-precoded pilot, where the second UE is a UE that is already configured to 4Tx MIMO mode.

With reference to any one of the first to the fourth possible implementations of the second aspect, after the sending, by a base station, state information of a scheduled non-precoded pilot to an RNC, in a tenth possible implementation, the method further includes: notifying, by the base station when current state of the scheduled non-precoded pilot is not consistent with the state of the scheduled non-precoded pilot that is acquired by the first UE according to the state information of the scheduled non-precoded pilot, the first UE to change state of the scheduled non-precoded pilot, where the instructing is performed.

According to a third aspect, a method for indicating pilot state is provided and includes: receiving, by a user equipment UE, 4Tx multi-input multi-output MIMO mode configuration signaling sent by a radio network controller RNC, where the configuration signaling carries state information that is of a scheduled non-precoded pilot and acquired by the RNC, and the state information of the scheduled non-precoded pilot indicates activated state or deactivated state of the scheduled non-precoded pilot; and acquiring, by the UE, state of the scheduled non-precoded pilot according to the state information of the scheduled non-precoded pilot when being configured to 4Tx MIMO mode according to the configuration signaling.

In a first possible implementation, the state information of the scheduled non-precoded pilot is sent after a base station changes state of the scheduled non-precoded pilot.

With reference to the third aspect or the first possible implementation of the third aspect, in a second possible implementation, after the acquiring, by the UE, state of the scheduled non-precoded pilot according to the state information of the scheduled non-precoded pilot, the method further includes: receiving, by the UE, signaling for changing state of the scheduled non-precoded pilot from the base station, and changing state of the scheduled non-precoded pilot according to the signaling for changing state of the scheduled non-precoded pilot, where the signaling for changing state of the scheduled non-precoded pilot is sent by the base station when current state of the scheduled non-precoded pilot is not consistent with the state of the scheduled non-precoded pilot that is acquired by the UE according to the state information of the scheduled non-precoded pilot.

According to a fourth aspect, a method for indicating pilot state is provided and includes: receiving, by a user equipment UE, 4Tx multi-input multi-output MIMO mode configuration signaling sent by a radio network controller RNC; and determining, by the UE when being configured to 4Tx MIMO mode according to the configuration signaling, that state of the scheduled non-precoded pilot is deactivated.

In a first possible implementation, after the UE determines that state of the scheduled non-precoded pilot is deactivated, the method further includes: receiving, by the UE, signaling for changing state of the scheduled non-precoded pilot from a base station, and changing state of the scheduled non-precoded pilot to activated according to the signaling for changing state of the scheduled non-precoded pilot, where the signaling for changing state of the scheduled non-precoded pilot is sent by the base station when the base station determines that current state of the scheduled non-precoded pilot is activated.

According to a fifth aspect, a method for indicating pilot state is provided and includes: after a user equipment UE is configured to 4Tx MIMO mode and determines that state of a scheduled non-precoded pilot is deactivated, if current state of the scheduled non-precoded pilot is activated, sending, by a base station, signaling for changing state of the scheduled non-precoded pilot to the UE, so that the UE changes state of the scheduled non-precoded pilot to activated.

According to a sixth aspect, a method for indicating pilot state is provided and includes: acquiring, by a drift radio network controller DRNC, state information of a scheduled non-precoded pilot from state information that is of the scheduled non-precoded pilot and sent by a base station, where the acquired state information of the scheduled non-precoded pilot indicates activated state or deactivated state of the scheduled non-precoded pilot; and sending, by the DRNC, the acquired state information of the scheduled non-precoded pilot to a serving radio network controller SRNC, so that the SRNC sends, to a first user equipment UE, first 4Tx multi-input multi-output MIMO mode configuration signaling that carries the state information of the scheduled non-precoded pilot, and the first UE acquires state of the scheduled non-precoded pilot according to the state information of the scheduled non-precoded pilot when being configured to 4Tx MIMO mode.

In a first possible implementation, the method further includes: receiving, by the DRNC, second 4Tx MIMO mode configuration signaling sent by the SRNC, and sending third 4Tx MIMO mode configuration signaling to the base station; the acquiring, by a DRNC, state information of a scheduled non-precoded pilot from state information that is of the scheduled non-precoded pilot and sent by a base station includes: receiving, by the DRNC, a response message of the third 4Tx MIMO mode configuration signaling from the base station, where the response message of the third 4Tx MIMO mode configuration signaling includes the state information of the scheduled non-precoded pilot; and the sending, by the DRNC, the acquired state information of the scheduled non-precoded pilot to an SRNC, includes: sending, by the DRNC, a response message of the second 4Tx MIMO mode configuration signaling to the SRNC, where the response message of the second 4Tx MIMO mode configuration signaling includes the state information of the scheduled non-precoded pilot, where the state information of the scheduled non-precoded pilot included in the response message of the second 4Tx MIMO mode configuration signaling is acquired by the DRNC from the response message of the third 4Tx MIMO mode configuration signaling.

In a second possible implementation, the method further includes: receiving, by the DRNC, second 4Tx MIMO mode configuration signaling sent by the SRNC; and the sending, by the DRNC, the acquired state information of the scheduled non-precoded pilot to an SRNC includes: sending, by the DRNC, a response message of the second 4Tx MIMO mode configuration signaling to the SRNC, where the response message of the second 4Tx MIMO mode configuration signaling includes the state information of the scheduled non-precoded pilot, where the state information of the scheduled non-precoded pilot included in the response message is acquired by the DRNC from the state information of the scheduled non-precoded pilot sent by the base station.

With reference to the first possible implementation of the sixth aspect, in a third possible implementation, the state information of the scheduled non-precoded pilot sent by the base station is state information of the scheduled non-precoded pilot that is sent after the base station changes state of the scheduled non-precoded pilot.

With reference to the first possible implementation of the sixth aspect, in a fourth possible implementation, the state information of the scheduled non-precoded pilot sent by the base station is included in a resource state indication message sent by the base station.

With reference to any one of the first to the fourth possible implementations of the sixth aspect, In a fifth possible implementation, the second 4Tx MIMO mode configuration signaling is included in a radio link setup message or a radio link addition message or a radio link reconfiguration request message or a radio link reconfiguration prepare message.

With reference to any one of the first to the fourth possible implementations of the sixth aspect, in a sixth possible implementation, the response message of the second 4Tx MIMO mode configuration signaling is included in a radio link setup response message or a radio link addition response message or a radio link reconfiguration response message or a radio link reconfiguration ready message.

According to a seventh aspect, a radio network controller is provided and includes: an acquiring module, configured to acquire state information of a scheduled non-precoded pilot, where the state information of the scheduled non-precoded pilot indicates activated state or deactivated state of the scheduled non-precoded pilot; and a sending module, configured to send first 4Tx multi-input multi-output MIMO mode configuration signaling to a user equipment UE, where the first 4Tx multi-input multi-output MIMO mode configuration signaling carries the state information of the scheduled non-precoded pilot, so that the UE acquires state of the scheduled non-precoded pilot according to the state information of the scheduled non-precoded pilot when being configured to 4Tx MIMO mode.

In a first possible implementation, the radio network controller further includes a receiving module, and the receiving module is configured to receive the state information of the scheduled non-precoded pilot from a base station; or, the receiving module is configured to receive the state information of the scheduled non-precoded pilot from a drift radio network controller DRNC, where the state information of the scheduled non-precoded pilot is acquired by the DRNC from state information of the scheduled non-precoded pilot sent by a base station; and the acquiring module is specifically configured to acquire the state information of the scheduled non-precoded pilot from the state information of the scheduled non-precoded pilot received by the receiving module.

In a second possible implementation, the radio network controller further includes a receiving module, and the sending module is further configured to send second 4Tx MIMO mode configuration signaling to a base station; the receiving module is configured to receive a response message of the second 4Tx MIMO mode configuration signaling from the base station, where the response message of the second 4Tx MIMO mode configuration signaling includes the state information of the scheduled non-precoded pilot; and the acquiring module is specifically configured to acquire the state information of the scheduled non-precoded pilot from the response message received by the receiving module.

In a third possible implementation, the radio network controller further includes a receiving module, and the sending module is further configured to send second 4Tx MIMO mode configuration signaling to a drift radio network controller DRNC, so that the DRNC sends third 4Tx MIMO mode configuration signaling to a base station; the receiving module is configured to receive a response message of the second 4Tx MIMO mode configuration signaling from the DRNC, where the response message of the second 4Tx MIMO mode configuration signaling includes the state information of the scheduled non-precoded pilot, where the state information of the scheduled non-precoded pilot is acquired by the DRNC from a response message sent by the base station in response to the third 4Tx MIMO mode configuration signaling; and the acquiring module is specifically configured to acquire the state information of the scheduled non-precoded pilot from the response message received by the receiving module.

In a fourth possible implementation, the radio network controller further includes a receiving module, and the sending module is further configured to send second 4Tx MIMO mode configuration signaling to a drift radio network controller DRNC; the receiving module is configured to receive a response message of the second 4Tx MIMO mode configuration signaling from the DRNC, where the response message of the second 4Tx MIMO mode configuration signaling includes the state information of the scheduled non-precoded pilot, where the state information of the scheduled non-precoded pilot is acquired by the DRNC from state information of the scheduled non-precoded pilot sent by a base station; and the acquiring module is specifically configured to acquire the state information of the scheduled non-precoded pilot from the response message received by the receiving module.

With reference to the first possible implementation of the seventh aspect, in a fifth possible implementation, the receiving module is specifically configured to receive a resource state indication message sent by the base station, where the resource state indication message includes the state information of the scheduled non-precoded pilot; and the acquiring module is specifically configured to acquire the state information of the scheduled non-precoded pilot from the resource state indication message.

With reference to the fifth possible implementation of the seventh aspect, in a sixth possible implementation, the receiving module is specifically configured to: after the base station changes state of the scheduled non-precoded pilot, receive the state information of the scheduled non-precoded pilot from the base station.

With reference to the second possible implementation of the seventh aspect or the third possible implementation of the seventh aspect or the fourth possible implementation of the seventh aspect, in a seventh possible implementation, the sending module is specifically configured to send a radio link setup message or a radio link addition message or a radio link reconfiguration request message or a radio link reconfiguration prepare message to the DRNC, where the second 4Tx MIMO mode configuration signaling is included in the radio link setup message or the radio link addition message or the radio link reconfiguration request message or the radio link reconfiguration prepare message.

With reference to the second possible implementation of the seventh aspect or the third possible implementation of the seventh aspect or the fourth possible implementation of the seventh aspect, in an eighth possible implementation, the receiving module is specifically configured to receive a radio link setup response message or a radio link addition response message or a radio link reconfiguration response message or a radio link reconfiguration ready message sent by the DRNC, where the response message of the second 4Tx MIMO mode configuration signaling is included in the radio link setup response message or the radio link addition response message or the radio link reconfiguration response message or the radio link reconfiguration ready message; the acquiring module is specifically configured to acquire the state information of the scheduled non-precoded pilot from the radio link setup response message or the radio link addition response message or the radio link reconfiguration response message or the radio link reconfiguration ready message.

According to an eighth aspect, a base station is provided and includes: a determining module, configured to determine state information of a scheduled non-precoded pilot, where the state information of the scheduled non-precoded pilot indicates activated state or deactivated state of the scheduled non-precoded pilot; and a sending module, configured to send the state information of the scheduled non-precoded pilot to a radio network controller RNC, so that the RNC sends, to a first user equipment UE, first 4Tx multi-input multi-output MIMO mode configuration signaling that carries the state information of the scheduled non-precoded pilot, and the first UE acquires state of the scheduled non-precoded pilot according to the state information of the scheduled non-precoded pilot when being configured to 4Tx MIMO mode.

In a first possible implementation, the RNC is a serving radio network controller SRNC, and the sending module is specifically configured to send the state information of the scheduled non-precoded pilot to the SRNC directly; or the sending module is specifically configured to send the state information of the scheduled non-precoded pilot to the SRNC through a drift radio network controller DRNC.

In a second possible implementation, the RNC is a serving radio network controller SRNC, and the base station further includes a receiving module, where the receiving module is configured to receive second 4Tx MIMO mode configuration signaling sent by the SRNC; and the sending module is specifically configured to send a response message of the second 4Tx MIMO mode configuration signaling to the SRNC, where the response message includes the state information of the scheduled non-precoded pilot.

In a third possible implementation, the RNC is a serving radio network controller SRNC, and the sending module is specifically configured to send the state information of the scheduled non-precoded pilot to a drift radio network controller DRNC, so that after the DRNC receives second 4Tx MIMO mode configuration signaling sent by the SRNC, the DRNC sends a response message of the second 4Tx MIMO mode configuration signaling to the SRNC, where the response message includes the state information of the scheduled non-precoded pilot, and the state information of the scheduled non-precoded pilot included in the response message is acquired by the DRNC from the state information of the scheduled non-precoded pilot sent by the sending module.

In a fourth possible implementation, the RNC is a serving radio network controller SRNC, and the base station further includes a receiving module, where the receiving module is configured to receive third 4Tx MIMO mode configuration signaling sent by a drift radio network controller DRNC, where the third 4Tx MIMO mode configuration signaling is sent after the DRNC receives second 4Tx MIMO mode configuration signaling sent by the SRNC; and the sending module is specifically configured to send a response message of the third 4Tx MIMO mode configuration signaling to the DRNC, so that the DRNC sends a response message of the second 4Tx MIMO mode configuration signaling to the SRNC, where both the response message of the second 4Tx MIMO mode configuration signaling and the response message of the third 4Tx MIMO mode configuration signaling include the state information of the scheduled non-precoded pilot, where the state information of the scheduled non-precoded pilot included in the response message of the second 4Tx MIMO mode configuration signaling is acquired by the DRNC from the response message of the third 4Tx MIMO mode configuration signaling.

With reference to the first possible implementation of the eighth aspect or the third possible implementation of the eighth aspect, in a fifth possible implementation, the sending module sends the state information of the scheduled non-precoded pilot after the base station changes state of the scheduled non-precoded pilot.

With reference to the first possible implementation of the eighth aspect or the third possible implementation of the eighth aspect, in a sixth possible implementation, the sending module is specifically configured to send a resource state indication message, where the sent resource state indication message includes the state information of the scheduled non-precoded pilot.

With reference to the second possible implementation of the eighth aspect or the fourth possible implementation of the eighth aspect, In a seventh possible implementation, the base station further includes a receiving module, and the receiving module is specifically configured to receive a radio link setup message or a radio link addition message or a radio link reconfiguration request message or a radio link reconfiguration prepare message, where the radio link setup message or the radio link addition message or the radio link reconfiguration request message or the radio link reconfiguration prepare message includes the second 4Tx MIMO mode configuration signaling.

With reference to the second possible implementation of the eighth aspect or the fourth possible implementation of the eighth aspect, in an eighth possible implementation, the sending module is specifically configured to send a radio link setup response message or a radio link addition response message or a radio link reconfiguration response message or a radio link reconfiguration ready message, where the radio link setup response message or the radio link addition response message or the radio link reconfiguration response message or the radio link reconfiguration ready message includes the response message of the second 4Tx MIMO mode configuration signaling.

In a ninth possible implementation, the sending module is further configured to: before the determining module determines the state information of the scheduled non-precoded pilot, notify a second UE to change state of the scheduled non-precoded pilot, where the second UE is a UE that is already configured to 4Tx MIMO mode.

With reference to the eighth aspect or the ninth possible implementation of the eighth aspect, in a tenth possible implementation, the sending module is further configured to: after sending the state information of the scheduled non-precoded pilot to the radio network controller RNC and when current state of the scheduled non-precoded pilot is not consistent with the state of the scheduled non-precoded pilot acquired by the first UE according to the state information of the scheduled non-precoded pilot, notify the first UE to change state of the scheduled non-precoded pilot.

According to a ninth aspect, a user equipment is provided and includes: a receiving module, configured to receive 4Tx multi-input multi-output MIMO mode configuration signaling sent by a radio network controller RNC, where the configuration signaling carries state information that is of a scheduled non-precoded pilot and acquired by the RNC, and the state information of the scheduled non-precoded pilot indicates activated state or deactivated state of the scheduled non-precoded pilot; and a processing module, configured to acquire state of the scheduled non-precoded pilot according to the state information of the scheduled non-precoded pilot when being configured to 4Tx MIMO mode according to the configuration signaling.

In a first possible implementation, the state information of the scheduled non-precoded pilot is sent after a base station changes state of the scheduled non-precoded pilot.

With reference to the ninth aspect or the first possible implementation of the ninth aspect, in a second possible implementation, the receiving module is further configured to: after the processing module acquires state of the scheduled non-precoded pilot according to the state information of the scheduled non-precoded pilot, receive signaling for changing state of the scheduled non-precoded pilot from the base station, and the processing module is further configured to change state of the scheduled non-precoded pilot according to the signaling for changing state of the scheduled non-precoded pilot, where the signaling for changing state of the scheduled non-precoded pilot is sent by the base station when current state of the scheduled non-precoded pilot is not consistent with the state of the scheduled non-precoded pilot that is acquired by the user equipment according to the state information of the scheduled non-precoded pilot.

According to a tenth aspect, a user equipment is provided and includes: a receiving module, configured to receive 4Tx multi-input multi-output MIMO mode configuration signaling sent by a radio network controller RNC; a processing module, configured to: when being configured to 4Tx MIMO mode according to the configuration signaling, determine that state of a scheduled non-precoded pilot is deactivated.

In a first possible implementation, the receiving module is further configured to: after the processing module determines that state of the scheduled non-precoded pilot is deactivated, receive signaling for changing state of the scheduled non-precoded pilot from a base station; and the processing module is further configured to change state of the scheduled non-precoded pilot to activated according to the signaling for changing state of the scheduled non-precoded pilot, where the signaling for changing state of the scheduled non-precoded pilot is sent when the base station determines that current state of the scheduled non-precoded pilot is activated.

According to an eleventh aspect, a base station is provided and includes: a determining module, configured to: after a user equipment UE is configured to 4Tx MIMO mode and determines that state of a scheduled non-precoded pilot is deactivated, determine that current state of the scheduled non-precoded pilot is activated; and a sending module, configured to send signaling for changing state of the scheduled non-precoded pilot to the UE so that the UE changes state of the scheduled non-precoded pilot to activated.

According to a twelfth aspect, a radio network controller is provided and includes: an acquiring module, configured to acquire state information of a scheduled non-precoded pilot from state information that is of the scheduled non-precoded pilot and sent by a base station, where the acquired state information of the scheduled non-precoded pilot indicates activated state or deactivated state of the scheduled non-precoded pilot; and a sending module, configured to send the acquired state information of the scheduled non-precoded pilot to a serving radio network controller SRNC, so that the SRNC sends, to a first user equipment UE, first 4Tx multi-input multi-output MIMO mode configuration signaling that carries the state information of the scheduled non-precoded pilot, and the first UE acquires state of the scheduled non-precoded pilot according to the state information of the scheduled non-precoded pilot when being configured to 4Tx MIMO mode.

In a first possible implementation, the radio network controller further includes a receiving module, where the receiving module is configured to receive second 4Tx MIMO mode configuration signaling sent by the SRNC, and is configured to receive a response message of third 4Tx MIMO mode configuration signaling from the base station, where the response message of the third 4Tx MIMO mode configuration signaling includes the state information of the scheduled non-precoded pilot; and the sending module is specifically configured to send the third 4Tx MIMO mode configuration signaling to the base station, and is specifically configured to send a response message of the second 4Tx MIMO mode configuration signaling to the SRNC, where the response message of the second 4Tx MIMO mode configuration signaling includes the state information of the scheduled non-precoded pilot, where the state information of the scheduled non-precoded pilot included in the response message of the second 4Tx MIMO mode configuration signaling is acquired by the acquiring module from the response message of the third 4Tx MIMO mode configuration signaling.

In a second possible implementation, the radio network controller further includes a receiving module, where the receiving module is configured to receive second 4Tx MIMO mode configuration signaling sent by the SRNC; and the sending module is specifically configured to send a response message of the second 4Tx MIMO mode configuration signaling to the SRNC, where the response message of the second 4Tx MIMO mode configuration signaling includes the state information of the scheduled non-precoded pilot, where the state information of the scheduled non-precoded pilot included in the response message is acquired by the acquiring module from state information of the scheduled non-precoded pilot sent by the base station.

With reference to the second possible implementation of the twelfth aspect, in a third possible implementation, the radio network controller further includes a receiving module, where the receiving module is configured to: after the base station changes state of the scheduled non-precoded pilot, receive the state information of the scheduled non-precoded pilot from the base station; and the acquiring module acquires the state information of the scheduled non-precoded pilot from the state information of the scheduled non-precoded pilot received by the receiving module.

With reference to the second possible implementation of the twelfth aspect, in a fourth possible implementation, the radio network controller further includes a receiving module, where the receiving module is configured to receive a resource state indication message that is sent by the base station and includes the state information of the scheduled non-precoded pilot, and the acquiring module acquires the state information of the scheduled non-precoded pilot from the state information of the scheduled non-precoded pilot received by the receiving module.

With reference to any one of the first to the fourth possible implementations of the twelfth aspect, in a fifth possible implementation, the radio network controller further includes a receiving module, where the receiving module is configured to receive a radio link setup message or a radio link addition message or a radio link reconfiguration request message or a radio link reconfiguration prepare message sent by the SRNC, where the second 4Tx MIMO mode configuration signaling is included in the radio link setup message or the radio link addition message or the radio link reconfiguration request message or the radio link reconfiguration prepare message.

With reference to any one of the first to the fourth possible implementations of the twelfth aspect, in a sixth possible implementation, the sending module is specifically configured to send a radio link setup response message or a radio link addition response message or a radio link reconfiguration response message or a radio link reconfiguration ready message to the SRNC, where the response message of the second 4Tx MIMO mode configuration signaling is included in the radio link setup response message or the radio link addition response message or the radio link reconfiguration response message or the radio link reconfiguration ready message.

According to a thirteenth aspect, a radio network controller is provided and includes: a processor, configured to acquire state information of a scheduled non-precoded pilot and determine first 4Tx multi-input multi-output MIMO mode configuration signaling, where the state information of the scheduled non-precoded pilot indicates activated state or deactivated state of the scheduled non-precoded pilot, and the configuration signaling carries the state information of the scheduled non-precoded pilot; and a transmitter, configured to send the first 4Tx multi-input multi-output MIMO mode configuration signaling to a user equipment UE, so that the UE acquires state of the scheduled non-precoded pilot according to the state information of the scheduled non-precoded pilot when being configured to 4Tx MIMO mode.

In a first possible implementation, the radio network controller further includes a receiver, the receiver is configured to receive the state information of the scheduled non-precoded pilot from a base station; or, the receiver is configured to receive the state information of the scheduled non-precoded pilot from a drift radio network controller DRNC, where the state information of the scheduled non-precoded pilot is acquired by the DRNC from state information of the scheduled non-precoded pilot sent by a base station; and the processor is specifically configured to acquire the state information of the scheduled non-precoded pilot from the state information of the scheduled non-precoded pilot received by the receiver.

In a second possible implementation, the radio network controller further includes a receiver, the transmitter is further configured to send second 4Tx MIMO mode configuration signaling to a base station; the receiver is configured to receive a response message of the second 4Tx MIMO mode configuration signaling from the base station, where the response message of the second 4Tx MIMO mode configuration signaling includes the state information of the scheduled non-precoded pilot; and the processor is specifically configured to acquire the state information of the scheduled non-precoded pilot from the response message received by the receiver.

In a third possible implementation, the radio network controller further includes a receiver, the transmitter is further configured to send second 4Tx MIMO mode configuration signaling to a drift radio network controller DRNC, so that the DRNC sends third 4Tx MIMO mode configuration signaling to a base station; the receiver is configured to receive a response message of the second 4Tx MIMO mode configuration signaling from the DRNC, where the response message of the second 4Tx MIMO mode configuration signaling includes the state information of the scheduled non-precoded pilot, where the state information of the scheduled non-precoded pilot is acquired by the DRNC from a response message sent by the base station in response to the third 4Tx MIMO mode configuration signaling; and the processor is specifically configured to acquire the state information of the scheduled non-precoded pilot from the response message received by the receiver.

In a fourth possible implementation, the radio network controller further includes a receiver, and the transmitter is further configured to send second 4Tx MIMO mode configuration signaling to a drift radio network controller DRNC; the receiver is configured to receive a response message of the second 4Tx MIMO mode configuration signaling from the DRNC, where the response message of the second 4Tx MIMO mode configuration signaling includes the state information of the scheduled non-precoded pilot, where the state information of the scheduled non-precoded pilot is acquired by the DRNC from state information of the scheduled non-precoded pilot sent by a base station; and the processor is specifically configured to acquire the state information of the scheduled non-precoded pilot from the response message received by the receiver.

With reference to the first possible implementation of the thirteenth aspect, in a fifth possible implementation, the receiver is specifically configured to receive a resource state indication message sent by the base station, where the resource state indication message includes the state information of the scheduled non-precoded pilot; and the processor is specifically configured to acquire the state information of the scheduled non-precoded pilot from the resource state indication message.

With reference to the fifth possible implementation of the thirteenth aspect, in a sixth possible implementation, the receiver is specifically configured to: after the base station changes state of the scheduled non-precoded pilot, receive the state information of the scheduled non-precoded pilot from the base station.

With reference to the second possible implementation of the thirteenth aspect or the third possible implementation of the thirteenth aspect or the fourth possible implementation of the thirteenth aspect, in a sixth possible implementation, the transmitter is specifically configured to send a radio link setup message or a radio link addition message or a radio link reconfiguration request message or a radio link reconfiguration prepare message to the DRNC, where the second 4Tx MIMO mode configuration signaling is included in the radio link setup message or the radio link addition message or the radio link reconfiguration request message or the radio link reconfiguration prepare message.

With reference to the second possible implementation of the thirteenth aspect or the third possible implementation of the thirteenth aspect or the fourth possible implementation of the thirteenth aspect, in a seventh possible implementation, the receiver is specifically configured to receive a radio link setup response message or a radio link addition response message or a radio link reconfiguration response message or a radio link reconfiguration ready message sent by the DRNC, where the response message of the second 4Tx MIMO mode configuration signaling is included in the radio link setup response message or the radio link addition response message or the radio link reconfiguration response message or the radio link reconfiguration ready message; and the processor is specifically configured to acquire the state information of the scheduled non-precoded pilot from the radio link setup response message or the radio link addition response message or the radio link reconfiguration response message or the radio link reconfiguration ready message.

According to a fourteenth aspect, a base station is provided and includes: a processor, configured to determine state information of a scheduled non-precoded pilot, where the state information of the scheduled non-precoded pilot indicates activated state or deactivated state of the scheduled non-precoded pilot; and a transmitter, configured to send the state information of the scheduled non-precoded pilot to a radio network controller RNC, so that the RNC sends, to a first user equipment UE, first 4Tx multi-input multi-output MIMO mode configuration signaling that carries the state information of the scheduled non-precoded pilot, and the first UE acquires state of the scheduled non-precoded pilot according to the state information of the scheduled non-precoded pilot when being configured to 4Tx MIMO mode.

In a first possible implementation, the RNC is a serving radio network controller SRNC, and the transmitter is specifically configured to send the state information of the scheduled non-precoded pilot to the SRNC directly; or the transmitter is specifically configured to send the state information of the scheduled non-precoded pilot to the SRNC through a drift radio network controller DRNC.

In a second possible implementation, the RNC is a serving radio network controller SRNC, and the base station further includes a receiver, where the receiver is configured to receive second 4Tx MIMO mode configuration signaling sent by the SRNC; and the transmitter is specifically configured to send a response message of the second 4Tx MIMO mode configuration signaling to the SRNC, where the response message includes the state information of the scheduled non-precoded pilot.

In a third possible implementation, the RNC is a serving radio network controller SRNC, and the transmitter is specifically configured to send the state information of the scheduled non-precoded pilot to a drift radio network controller DRNC, so that after the DRNC receives second 4Tx MIMO mode configuration signaling sent by the SRNC, the DRNC sends a response message of the second 4Tx MIMO mode configuration signaling to the SRNC, where the response message includes the state information of the scheduled non-precoded pilot, and the state information of the scheduled non-precoded pilot included in the response message is acquired by the DRNC from the state information of the scheduled non-precoded pilot sent by the base station.

In a fourth possible implementation, the RNC is a serving radio network controller SRNC, and the base station further includes a receiver, where the receiver is configured to receive third 4Tx MIMO mode configuration signaling sent by a drift radio network controller DRNC, where the third 4Tx MIMO mode configuration signaling is sent after the DRNC receives second 4Tx MIMO mode configuration signaling sent by the SRNC; and the transmitter is specifically configured to send a response message of the third 4Tx MIMO mode configuration signaling to the DRNC, so that the DRNC sends a response message of the second 4Tx MIMO mode configuration signaling to the SRNC, where both the response message of the second 4Tx MIMO mode configuration signaling and the response message of the third 4Tx MIMO mode configuration signaling include the state information of the scheduled non-precoded pilot, where the state information of the scheduled non-precoded pilot included in the response message of the second 4Tx MIMO mode configuration signaling is acquired by the DRNC from the response message of the third 4Tx MIMO mode configuration signaling.

With reference to the first possible implementation of the fourteenth aspect or the second possible implementation of the fourteenth aspect or the third possible implementation of the fourteenth aspect, in a fifth possible implementation, the transmitter sends the state information of the scheduled non-precoded pilot after the base station changes state of the scheduled non-precoded pilot.

With reference to the first possible implementation of the fourteenth aspect or the third possible implementation of the fourteenth aspect, in a sixth possible implementation, the transmitter is specifically configured to send a resource state indication message, where the sent resource state indication message includes the state information of the scheduled non-precoded pilot.

With reference to the second possible implementation of the fourteenth aspect or the fourth possible implementation of the fourteenth aspect, in a seventh possible implementation, the base station further includes a receiver, the receiver is configured to receive a radio link setup message or a radio link addition message or a radio link reconfiguration request message or a radio link reconfiguration prepare message, where the radio link setup message or the radio link addition message or the radio link reconfiguration request message or the radio link reconfiguration prepare message includes the second 4Tx MIMO mode configuration signaling.

In an eighth possible implementation, the transmitter is further configured to: before the processor determines the state information of the scheduled non-precoded pilot, notify a second UE to change state of the scheduled non-precoded pilot, where the second UE is a UE that is already configured to 4Tx MIMO mode.

With reference to the fourteenth aspect or the eighth possible implementation of the fourteenth aspect, in a ninth possible implementation, the transmitter is further configured to: after sending the state information of the scheduled non-precoded pilot to the radio network controller RNC and when current state of the scheduled non-precoded pilot is not consistent with the state of the scheduled non-precoded pilot acquired by the first UE according to the state information of the scheduled non-precoded pilot, notify the first UE to change state of the scheduled non-precoded pilot.

According to a fifteenth aspect, a user equipment is provided and includes: a receiver, configured to receive 4Tx multi-input multi-output MIMO mode configuration signaling sent by a radio network controller RNC, where the configuration signaling carries state information that is of a scheduled non-precoded pilot and acquired by the RNC, and the state information of the scheduled non-precoded pilot indicates activated state or deactivated state of the scheduled non-precoded pilot; and a processor, configured to acquire state of the scheduled non-precoded pilot according to the state information of the scheduled non-precoded pilot when being configured to 4Tx MIMO mode according to the configuration signaling.

In a first possible implementation, the state information of the scheduled non-precoded pilot is sent after a base station changes state of the scheduled non-precoded pilot.

With reference to the fifteenth aspect or the first possible implementation of the fifteenth aspect, in a second possible implementation, the receiver is further configured to: after the processor acquires state of the scheduled non-precoded pilot according to the state information of the scheduled non-precoded pilot, receive signaling for changing state of the scheduled non-precoded pilot from the base station, and the processor is further configured to change state of the scheduled non-precoded pilot according to the signaling for changing state of the scheduled non-precoded pilot, where the signaling for changing state of the scheduled non-precoded pilot is sent by the base station when current state of the scheduled non-precoded pilot is not consistent with the state of the scheduled non-precoded pilot acquired by the user equipment according to the state information of the scheduled non-precoded pilot.

According to a sixteenth aspect, a user equipment is provided and includes: a receiver, configured to receive 4Tx multi-input multi-output MIMO mode configuration signaling sent by a radio network controller RNC; a processor, configured to: when being configured to 4Tx MIMO mode according to the configuration signaling, determine that state of a scheduled non-precoded pilot is deactivated.

In a first possible implementation, the receiver is further configured to: after the processor determines that state of the scheduled non-precoded pilot is deactivated, receive signaling for changing state of the scheduled non-precoded pilot from a base station; and the processor is further configured to change state of the scheduled non-precoded pilot to activated according to the signaling for changing state of the scheduled non-precoded pilot, where the signaling for changing state of the scheduled non-precoded pilot is sent when the base station determines that current state of the scheduled non-precoded pilot is activated.

According to a seventeenth aspect, a base station is provided and includes: a processor, configured to: after a user equipment UE is configured to 4Tx MIMO mode and determines that state of a scheduled non-precoded pilot is deactivated, determine that current state of the scheduled non-precoded pilot is activated; and a transmitter, configured to send signaling for changing state of the scheduled non-precoded pilot to the UE so that the UE changes state of the scheduled non-precoded pilot to activated.

According to an eighteenth aspect, a radio network controller is provided and includes: a processor, configured to acquire state information of a scheduled non-precoded pilot from state information that is of the scheduled non-precoded pilot and sent by a base station, where the acquired state information of the scheduled non-precoded pilot indicates activated state or deactivated state of the scheduled non-precoded pilot; and a transmitter, configured to send the acquired state information of the scheduled non-precoded pilot to a serving radio network controller SRNC, so that the SRNC sends, to a first user equipment UE, first 4Tx multi-input multi-output MIMO mode configuration signaling that carries the state information of the scheduled non-precoded pilot, and the first UE acquires state of the scheduled non-precoded pilot according to the state information of the scheduled non-precoded pilot when being configured to 4Tx MIMO mode.

In a first possible implementation, the radio network controller further includes a receiver, where the receiver is configured to receive second 4Tx MIMO mode configuration signaling sent by the SRNC, and is configured to receive a response message of third 4Tx MIMO mode configuration signaling from the base station, where the response message of the third 4Tx MIMO mode configuration signaling includes the state information of the scheduled non-precoded pilot; and the transmitter is specifically configured to send the third 4Tx MIMO mode configuration signaling to the base station, and is specifically configured to send a response message of the second 4Tx MIMO mode configuration signaling to the SRNC, where the response message of the second 4Tx MIMO mode configuration signaling includes the state information of the scheduled non-precoded pilot, where the state information of the scheduled non-precoded pilot included in the response message of the second 4Tx MIMO mode configuration signaling is acquired by the processor from the response message of the third 4Tx MIMO mode configuration signaling.

In a second possible implementation, the radio network controller further includes a receiver, where the receiver is configured to receive second 4Tx MIMO mode configuration signaling sent by the SRNC; and the transmitter is specifically configured to send a response message of the second 4Tx MIMO mode configuration signaling to the SRNC, where the response message of the second 4Tx MIMO mode configuration signaling includes the state information of the scheduled non-precoded pilot, where the state information of the scheduled non-precoded pilot included in the response message is acquired by the processor from state information of the scheduled non-precoded pilot sent by the base station.

With reference to the second possible implementation of the eighteenth aspect, in a third possible implementation, the radio network controller further includes a receiver, and the receiver is configured to: after the base station changes state of the scheduled non-precoded pilot, receive the state information of the scheduled non-precoded pilot from the base station.

With reference to the second possible implementation of the eighteenth aspect, in a fourth possible implementation, the radio network controller further includes a receiver, and the receiver is configured to receive a resource state indication message that is sent by the base station and includes the state information of the scheduled non-precoded pilot.

With reference to any one of the first to the third possible implementations of the eighteenth aspect, in a fifth possible implementation, the radio network controller further includes a receiver, and the receiver is configured to receive a radio link setup message or a radio link addition message or a radio link reconfiguration request message or a radio link reconfiguration prepare message sent by the SRNC, where the second 4Tx MIMO mode configuration signaling is included in the radio link setup message or the radio link addition message or the radio link reconfiguration request message or the radio link reconfiguration prepare message.

With reference to any one of the first to the third possible implementations of the eighteenth aspect, in a sixth possible implementation, the transmitter is specifically configured to send a radio link setup response message or a radio link addition response message or a radio link reconfiguration response message or a radio link reconfiguration ready message to the SRNC, where the response message of the second 4Tx MIMO mode configuration signaling is included in the radio link setup response message or the radio link addition response message or the radio link reconfiguration response message or the radio link reconfiguration ready message.

According to a nineteenth aspect, a system is provided, where the system includes the radio network controller in any possible implementation of the seventh aspect, the base station in any possible implementation of the eighth aspect, and the user equipment in any possible implementation of the ninth aspect.

According to a twentieth aspect, a system is provided, where the system includes the user equipment in any possible implementation of the tenth aspect, and the base station in the eleventh aspect.

Based on the foregoing technical solutions, in the method for indicating pilot state, the radio network controller, the base station, the user equipment, and the system according to the embodiments of the present invention, the RNC sends 4Tx MIMO mode configuration signaling that carries state information of a scheduled non-precoded pilot to the UE, where the state information of the scheduled non-precoded pilot is received by the RNC from the base station, so that the UE acquires state of the scheduled non-precoded pilot according to the state information of the scheduled non-precoded pilot when being configured to 4Tx MIMO mode. In this way, there is a lower probability that the base station sends HS-SCCH signaling to notify the UE about state of the scheduled non-precoded pilot, which in turn reduces physical-layer signaling overheads and reduces a delay in acquiring state of the scheduled non-precoded pilot by the UE in 4Tx MIMO mode.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 7 is a schematic flowchart of a method for indicating pilot state according to still another embodiment of the present invention;

DESCRIPTION OF EMBODIMENTS

Figure 1:
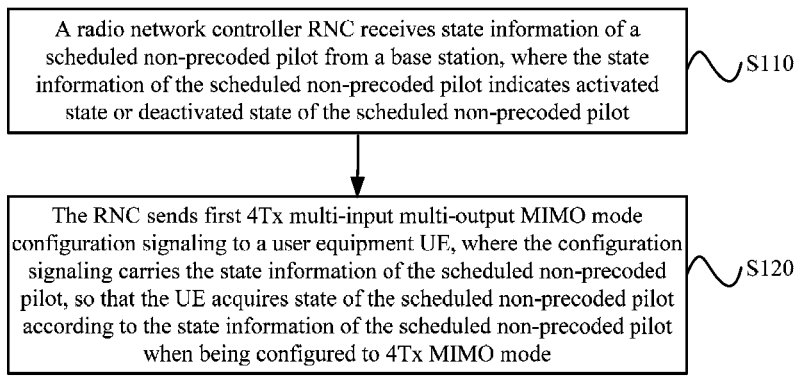
FIG. 1 is a schematic flowchart of a method for indicating pilot state according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (Global System for Mobile Communications, "GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short) system, a Long Term Evolution (Long Term Evolution, "LTE" for short) system, an LTE frequency division duplex (Frequency Division Duplex, "FDD" for short) system, an LTE time division duplex (Time Division Duplex, "TDD" for short), a Universal Mobile Telecommunications System (Universal Mobile Telecommunication System, "UMTS" for short), a Worldwide Interoperability for Microwave Access (Worldwide Interoperability for Microwave Access, "WiMAX" for short) communications system or the like.

It should also be understood that in the embodiments of the present invention, a user equipment (User Equipment, UE for short) may be referred to as a terminal (Terminal), a mobile station (Mobile Station, MS for short), a mobile terminal (Mobile Terminal), and the like. The user equipment may communicate with one or more core networks through a radio access network (Radio Access Network, RAN for short). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

In the embodiments of the present invention, a base station may be a base station (Base Transceiver Station, "BTS" for short) in the GSM or CDMA, may also be a base station (NodeB, "NB" for short) in the WCDMA, and may further be an evolved NodeB (Evolved NodeB, "eNB" or "e-NodeB" for short) in the LTE, which is not limited in the present invention. For ease of description, the following embodiments use the base station NodeB and the user equipment UE as examples.

In the embodiments of the present invention, a scheduled non-precoded pilot is also called a scheduled pilot or a demodulated common pilot. For ease of description, the following embodiments use a scheduled non-precoded pilot as an example for description.

FIG. 1 is a schematic flowchart of a method 100 for indicating pilot state according to an embodiment of the present invention. As shown in FIG. 1, the method 100 includes:

S110. A radio network controller RNC receives state information of a scheduled non-precoded pilot from a base station, where the state information of the scheduled non-precoded pilot indicates activated state or deactivated state of the scheduled non-precoded pilot.

S120. The RNC sends first 4Tx multi-input multi-output MIMO mode configuration signaling to a user equipment UE, where the configuration signaling carries the state information of the scheduled non-precoded pilot, so that the UE acquires state of the scheduled non-precoded pilot according to the state information of the scheduled non-precoded pilot when being configured to 4Tx MIMO mode.

Figure 2:
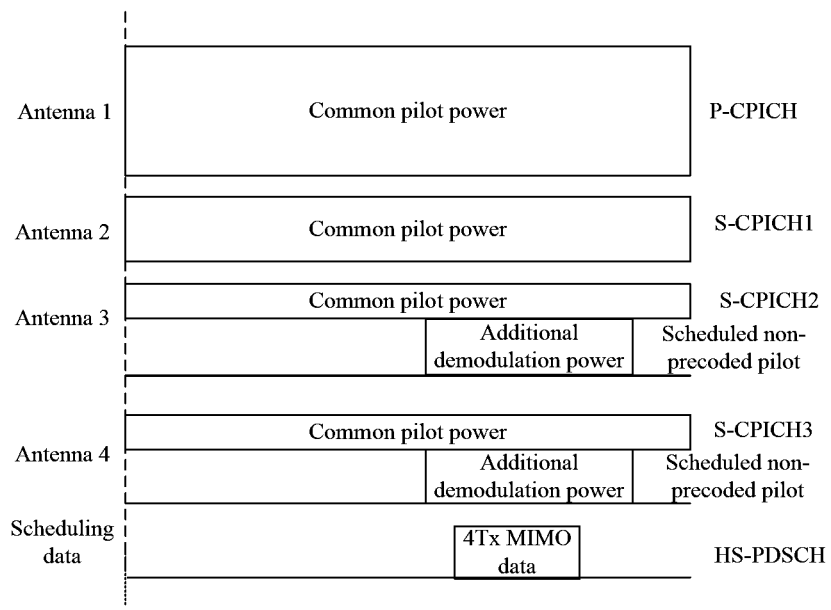
FIG. 2 is a schematic diagram of sending downlink 4Tx MIMO pilot and data.

In 4Tx MIMO mode, using a scheduled non-precoded pilot for data demodulation is supported. As shown in FIG. 2, an antenna 3 and an antenna 4 may not only send a common pilot, namely, an S-CPICH2 and an S-CPICH3, but also send a scheduled non-precoded pilot. Power of the scheduled non-precoded pilot is generally higher than that of a common pilot sent on the antenna 3 and the antenna 4, so as to help the UE perform more accurate channel estimation by using the scheduled non-precoded pilot and obtain better data demodulation performance. However, in a scenario in which a signal-to-noise ratio is relatively low, the scheduled non-precoded pilot is of little help to enhancing performance of the 4Tx MIMO UE. To reduce interference to other UEs, the scheduled non-precoded pilot may not be sent. A base station may decide, according to a cell condition, whether to activate the scheduled non-precoded pilot. State of the scheduled non-precoded pilot is categorized into two types: activated state and deactivated state. In this embodiment of the present invention, to enable the UE to learn state of the scheduled non-precoded pilot when the UE is configured to 4Tx MIMO mode, firstly, the RNC receives the state information of the scheduled non-precoded pilot from the base station, where the state information of the scheduled non-precoded pilot indicates activated state or deactivated state of the scheduled non-precoded pilot; then, the RNC sends, to the UE, first 4Tx MIMO mode configuration signaling that carries the state information of the scheduled non-precoded pilot, so that the UE acquires state of the scheduled non-precoded pilot according to the state information of the scheduled non-precoded pilot when being configured to 4Tx MIMO mode. In this way, the base station does not need to send HS-SCCH signaling to notify the UE about activated or deactivated state of the scheduled non-precoded pilot. Rather, the UE can acquire state of the scheduled non-precoded pilot from the state information of the scheduled non-precoded pilot when being configured to 4Tx MIMO mode.

In the method for indicating pilot state according to this embodiment of the present invention, an RNC sends, to a UE, first 4Tx MIMO mode configuration signaling that carries state information of a scheduled non-precoded pilot, so that the UE can acquire state of the scheduled non-precoded pilot according to the state information of the scheduled non-precoded pilot when being configured to 4Tx MIMO mode, where the state information of the scheduled non-precoded pilot is received by the RNC from a base station. By practicing the method, sending HS-SCCH signaling by the base station to notify the UE about state of the scheduled non-precoded pilot is avoided to reduce physical-layer signaling overheads and to reduce a delay in acquiring state of the scheduled non-precoded pilot by the UE in 4Tx MIMO mode.

In S110, the RNC receives the state information of the scheduled non-precoded pilot from the base station.

Specifically, the base station sends the state information of the scheduled non-precoded pilot to the RNC by using Iub interface signaling. For example, the base station uses one bit or one information element in the Iub interface signaling to represent the state information of the scheduled non-precoded pilot, that is to say, uses one bit or one information element in the Iub interface signaling to indicate that the scheduled non-precoded pilot is in activated state or deactivated state. The RNC receives the state information of the scheduled non-precoded pilot through the Iub interface signaling.

Optionally, after the state information of the scheduled non-precoded pilot changes, the base station sends changed state information of the scheduled non-precoded pilot to the RNC. Optionally, the Iub interface signaling may be a resource state indication message.

In S120, the RNC sends the first 4Tx MIMO mode configuration signaling to the UE, where the configuration signaling carries the state information of the scheduled non-precoded pilot.

Specifically, the RNC configures the UE to 4Tx MIMO mode by using radio resource control (Radio Resource Control, "RRC" for short) signaling, where the RNC includes into the RRC signaling the state information of the scheduled non-precoded pilot that is previously received from the base station. For example, the RNC uses one bit or one information element in the RRC signaling to represent the state information of the scheduled non-precoded pilot, that is to say, uses one bit or one information element in the RRC signaling to indicate that the scheduled non-precoded pilot is in activated state or deactivated state. Because the RRC signaling carries the state information of the scheduled non-precoded pilot, the UE may learn activated state or deactivated state of the scheduled non-precoded pilot when being successfully configured to 4Tx MIMO mode. In this way, the base station may use 4Tx MIMO scheduling data when 4Tx MIMO mode is configured successfully, and according to the learned activated state or deactivated state of the scheduled non-precoded pilot, the UE may also correspondingly use or not use the scheduled non-precoded pilot to demodulate 4Tx MIMO data, thereby reducing a scheduling delay. In addition, since the RRC signaling is used to carry state of the scheduled non-precoded pilot, sending physical-layer signaling by the base station to notify activated state or deactivated state of the scheduled non-precoded pilot is avoided and physical-layer signaling overheads are reduced.

Figure 3:
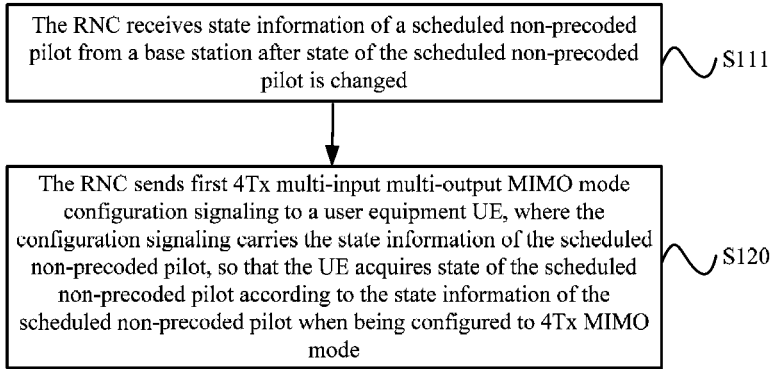
FIG. 3 is another schematic flowchart of a method for indicating pilot state according to an embodiment of the present invention.

In this embodiment of the present invention, as shown in FIG. 3, optionally, S110 includes:

S111. The RNC receives the state information of the scheduled non-precoded pilot from the base station after state of the scheduled non-precoded pilot is changed.

Specifically, it leaves to the base station to decide whether to activate the scheduled non-precoded pilot. In other words, the base station may change state of the scheduled non-precoded pilot according to a cell condition, and use HS-SCCH signaling to notify a UE that is currently already configured to 4Tx MIMO mode to change state of the scheduled non-precoded pilot. The base station sends the state information of the scheduled non-precoded pilot to the RNC after changing state of the scheduled non-precoded pilot, and notifies the RNC of latest state of the scheduled non-precoded pilot. In this way, when configuring 4Tx MIMO for a subsequent UE, the RNC can transmit current state of the scheduled non-precoded pilot to the UE.

It should be understood that if the base station keeps state of the scheduled non-precoded pilot unchanged, the state of the scheduled non-precoded pilot that is initially determined by the base station is current state of the scheduled non-precoded pilot. That is to say, the state information of the scheduled non-precoded pilot that is initially sent by the base station to the RNC indicates current state of the scheduled non-precoded pilot.

In the method for indicating pilot state according to this embodiment of the present invention, an RNC sends, to a UE, first 4Tx MIMO mode configuration signaling that carries a state information of a scheduled non-precoded pilot, so that the UE can acquire state of the scheduled non-precoded pilot when being configured to 4Tx MIMO mode, where the state information of the scheduled non-precoded pilot is received by the RNC from a base station. By practicing the method, sending HS-SCCH signaling by the base station to notify the UE about state of the scheduled non-precoded pilot is avoided to reduce physical-layer signaling overheads and to reduce a delay in acquiring state of the scheduled non-precoded pilot by the UE, which ultimately shortens a scheduling delay.

The foregoing describes in detail the method for indicating pilot state with reference to FIG. 1 to FIG. 3 from a perspective of an RNC. The following describes in detail the method for indicating pilot state with reference to FIG. 4 and FIG. 6 from a perspective of a base station.

Figure 4:
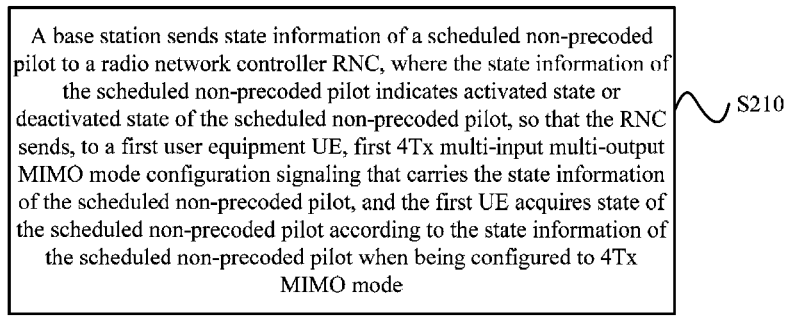
FIG. 4 is a schematic flowchart of a method for indicating pilot state according to another embodiment of the present invention.

FIG. 4 is a schematic flowchart of a method 200 for indicating pilot state according to another embodiment of the present invention. As shown in FIG. 4, the method 200 includes:

S210. A base station sends state information of a scheduled non-precoded pilot to a radio network controller RNC, where the state information of the scheduled non-precoded pilot indicates activated state or deactivated state of the scheduled non-precoded pilot, so that the RNC sends, to a first user equipment UE, first 4Tx multi-input multi-output MIMO mode configuration signaling that carries the state information of the scheduled non-precoded pilot, and the first UE acquires state of the scheduled non-precoded pilot according to the state information of the scheduled non-precoded pilot when being configured to 4Tx MIMO mode.

In this embodiment of the present invention, the first UE is a UE that is to be configured to 4Tx MIMO mode. To enable the first UE to learn state of the scheduled non-precoded pilot when the first UE is configured to 4Tx MIMO mode, the base station sends the state information of the scheduled non-precoded pilot to the RNC, where the state information of the scheduled non-precoded pilot indicates activated state or deactivated state of the scheduled non-precoded pilot. Then, the RNC sends the first 4Tx MIMO mode configuration signaling that carries the state information of the scheduled non-precoded pilot to the first UE, so that the first UE acquires state of the scheduled non-precoded pilot according to the state information of the scheduled non-precoded pilot when being configured to 4Tx MIMO mode. Therefore, the base station does not need to send HS-SCCH signaling to notify the UE about activated or deactivated state of the scheduled non-precoded pilot. In addition, the base station may use 4Tx MIMO scheduling data when 4Tx MIMO mode is configured successfully, and according to the learned activated state or deactivated state of the scheduled non-precoded pilot, the first UE may also use or not use the scheduled non-precoded pilot correspondingly to demodulate 4Tx MIMO data, thereby reducing a scheduling delay.

Specifically, the base station sends the state information of the scheduled non-precoded pilot to the RNC by using Iub interface signaling. For example, the base station uses one bit or one information element in the Iub interface signaling to represent the state information of the scheduled non-precoded pilot, that is to say, uses one bit or one information element in the Iub interface signaling to indicate that the scheduled non-precoded pilot is in activated state or the deactivated state. Optionally, after the state information of the scheduled non-precoded pilot changes, the base station sends changed state information of the scheduled non-precoded pilot to the RNC. Optionally, the Iub interface signaling may be a resource state indication message.

In the method for indicating pilot state according to this embodiment of the present invention, a base station sends state information of a scheduled non-precoded pilot to an RNC, so that the RNC sends, to a UE, first 4Tx MIMO mode configuration signaling that carries the state information of the scheduled non-precoded pilot, and the UE acquires state of the scheduled non-precoded pilot according to the state information of the scheduled non-precoded pilot when being configured to 4Tx MIMO mode. By practicing the method, sending HS-SCCH signaling by the base station to notify the UE about state of the scheduled non-precoded pilot is avoided to reduce physical-layer signaling overheads and to reduce a delay in acquiring state of the scheduled non-precoded pilot by the UE in 4Tx MIMO mode.

Figure 5:
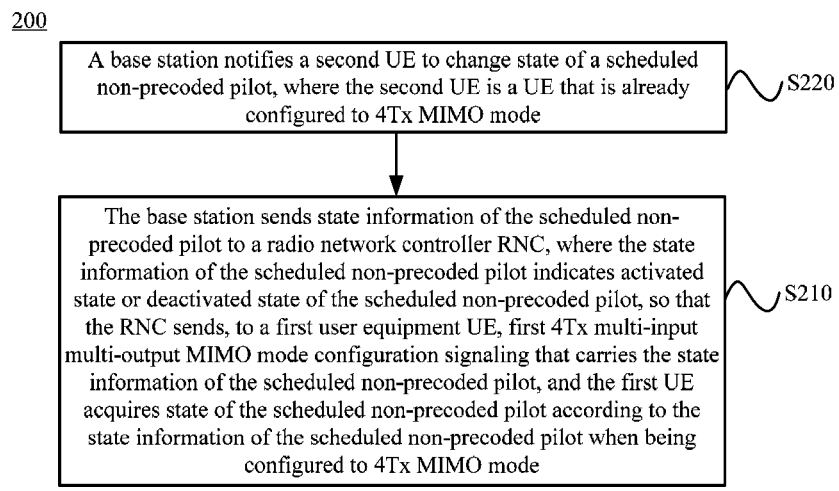
FIG. 5 is another schematic flowchart of a method for indicating pilot state according to another embodiment of the present invention.

In this embodiment of the present invention, as shown in FIG. 5, optionally, before S210, the method 200 further includes:

S220. The base station notifies a second UE to change state of the scheduled non-precoded pilot, where the second UE is a UE that is already configured to 4Tx MIMO mode.

Specifically, the base station may change state of the scheduled non-precoded pilot according to a cell condition. When the base station determines that state of the scheduled non-precoded pilot is changed, the base station uses HS-SCCH signaling to notify the second UE to change state of the scheduled non-precoded pilot, where the second UE is a UE that is already configured to 4Tx MIMO mode. In addition, the base station sends the state information of the scheduled non-precoded pilot to the RNC, so that latest state of the scheduled non-precoded pilot is notified to the RNC. In this way, when configuring 4Tx MIMO for the first UE, the RNC can transmit current state of the scheduled non-precoded pilot to the UE.

Figure 6:
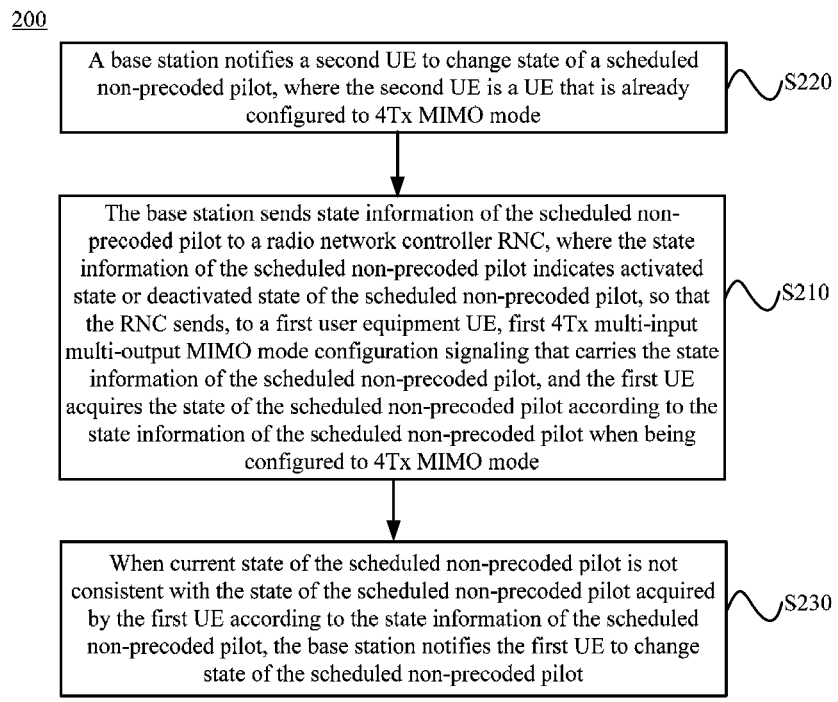
FIG. 6 is still another schematic flowchart of a method for indicating pilot state according to another embodiment of the present invention.

In this embodiment of the present invention, as shown in FIG. 6, optionally, after S210, the method 200 further includes:

S230. When current state of the scheduled non-precoded pilot is not consistent with the state of the scheduled non-precoded pilot acquired by the first UE according to the state information of the scheduled non-precoded pilot, the base station notifies the first UE to change state of the scheduled non-precoded pilot.

Specifically, the RNC uses RRC signaling to configure the first UE to 4Tx MIMO mode, and it may take up to hundreds of ms to deliver the RRC signaling. In a process of delivering the RRC signaling by the RNC to configure 4Tx MIMO mode, the base station may have changed state of the scheduled non-precoded pilot of the base station. That is to say, after the first UE is configured to 4Tx MIMO mode, there may be cases where current state of the scheduled non-precoded pilot is not consistent with the state of the scheduled non-precoded pilot acquired by the first UE according to the state information of the scheduled non-precoded pilot. If this does happen, the base station may notify the first UE to change state of the scheduled non-precoded pilot. In other words, the base station may use HS-SCCH signaling to notify the first UE of correct state of the scheduled non-precoded pilot. However, because the base station needs to consider conditions of an entire cell when deciding whether to activate or deactivate the scheduled non-precoded pilot, state of the scheduled non-precoded pilot is not changed frequently. A probability of the state change is low, especially in a process of delivering the RRC signaling by the RNC to configure 4Tx MIMO mode.

In the method for indicating pilot state according to this embodiment of the present invention, a base station sends state information of a scheduled non-precoded pilot to an RNC, so that the RNC sends, to a UE, first 4Tx MIMO mode configuration signaling that carries the state information of the scheduled non-precoded pilot, and the UE acquires state of the scheduled non-precoded pilot when being configured to 4Tx MIMO mode. By practicing the method, there is a lower probability that the base station sends HS-SCCH signaling to notify the UE about state of the scheduled non-precoded pilot, which in turn reduces physical-layer signaling overheads and reduces a scheduling delay by shortening a delay in acquiring state of the scheduled non-precoded pilot by the UE.

It should be understood that in this embodiment of the present invention, interaction between the RNC, the base station and the UE, related features and functions, and the like are described from a perspective of an RNC side, and correspond to those described from a perspective of a base station side. For brevity, details are not repeatedly described herein.

The foregoing describes in detail the method for indicating pilot state with reference to FIG. 1 to FIG. 3 from a perspective of an RNC; and describes in detail the method for indicating pilot state with reference to FIG. 4 to FIG. 6 from a perspective of a base station. The following describes in detail the method for indicating pilot state with reference to FIG. 7 and FIG. 8 from a perspective of a UE.

FIG. 7 is a schematic flowchart of a method 300 for indicating pilot state according to still another embodiment of the present invention. As shown in FIG. 7, the method 300 includes:

S310. A user equipment UE receives first 4Tx multi-input multi-output MIMO mode configuration signaling sent by a radio network controller RNC, where the configuration signaling carries state information that is of a scheduled non-precoded pilot and received by the RNC from a base station, and the state information of the scheduled non-precoded pilot indicates activated state or deactivated state of the scheduled non-precoded pilot.

S320. The UE acquires state of the scheduled non-precoded pilot according to the state information of the scheduled non-precoded pilot when being configured to 4Tx MIMO mode according to the configuration signaling.

In the prior art, when being initially configured to 4Tx MIMO mode, the UE does not know whether the scheduled non-precoded pilot is activated or deactivated, and therefore, the base station still needs to send HS-SCCH signaling to notify the UE about state of the scheduled non-precoded pilot. In this embodiment of the present invention, after the base station sends the state information of the scheduled non-precoded pilot to the RNC, the UE receives the first 4Tx MIMO mode configuration signaling sent by the RNC, where the configuration signaling carries the state information of the scheduled non-precoded pilot. Then, the UE is configured to 4Tx MIMO mode according to the configuration signaling, and acquires state of the scheduled non-precoded pilot according to the state information of the scheduled non-precoded pilot. In this way, the UE can acquire state of the scheduled non-precoded pilot when being configured to 4Tx MIMO mode. Therefore, the base station does not need to send HS-SCCH signaling to notify the UE about activated or deactivated state of the scheduled non-precoded pilot.

Specifically, the UE receives the first 4Tx MIMO mode configuration signaling sent by the RNC by using RRC signaling. The RNC includes into the RRC signaling the state information of the scheduled non-precoded pilot that is previously received from the base station. For example, the RNC uses one bit or one information element in the RRC signaling to represent the state information of the scheduled non-precoded pilot, that is to say, uses one bit or one information element in the RRC signaling to indicate that the scheduled non-precoded pilot is in activated state or deactivated state. Because the RRC signaling carries the state information of the scheduled non-precoded pilot, the UE can learn activated state or deactivated state of the scheduled non-precoded pilot when being successfully configured to 4Tx MIMO mode. In this way, the base station may use 4Tx MIMO scheduling data when 4Tx MIMO mode is configured successfully, and according to the learned activated state or deactivated state of the scheduled non-precoded pilot, the UE may also correspondingly use or not use the scheduled non-precoded pilot to demodulate 4Tx MIMO data, thereby reducing a scheduling delay.

In the method for indicating pilot state according to this embodiment of the present invention, a UE receives 4Tx MIMO mode configuration signaling that is sent by an RNC and carries state information of a scheduled non-precoded pilot, and the UE acquires state of the scheduled non-precoded pilot according to the state information of the scheduled non-precoded pilot when being configured to 4Tx MIMO mode. By practicing the method, sending HS-SCCH signaling by the base station to notify the UE about state of the scheduled non-precoded pilot is avoided to reduce physical-layer signaling overheads and to reduce a delay in acquiring state of the scheduled non-precoded pilot by the UE in 4Tx MIMO mode.

In this embodiment of the present invention, optionally, the state information of the scheduled non-precoded pilot is sent after the base station changes state of the scheduled non-precoded pilot.

The base station may change state of the scheduled non-precoded pilot according to a cell condition, specifically, the base station may use HS-SCCH signaling to notify a UE that is already configured to 4Tx MIMO mode to change state of the scheduled non-precoded pilot. The base station sends the state information of the scheduled non-precoded pilot to the RNC after changing state of the scheduled non-precoded pilot, and notifies the RNC of latest state of the scheduled non-precoded pilot. In this way, by receiving the configuration signaling that is sent by the RNC and carries the state information of the scheduled non-precoded pilot, the UE can acquire current state of the scheduled non-precoded pilot when being configured to 4Tx MIMO mode.

Figure 8:
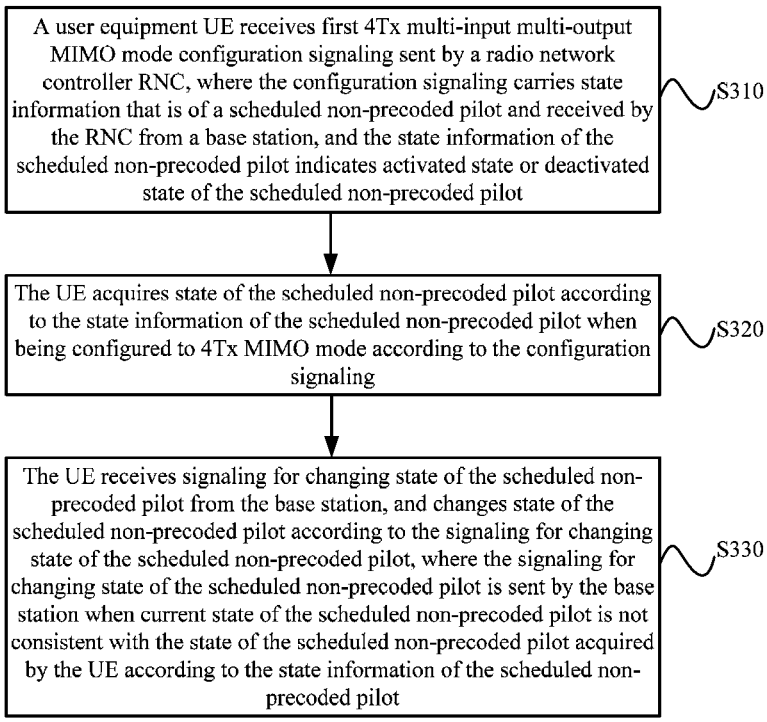
FIG. 8 is another schematic flowchart of a method for indicating pilot state according to still another embodiment of the present invention.

In this embodiment of the present invention, as shown in FIG. 8, optionally, after S320, the method 300 further includes:

S330. The UE receives signaling for changing state of the scheduled non-precoded pilot from the base station, and changes state of the scheduled non-precoded pilot according to the signaling for changing state of the scheduled non-precoded pilot, where the signaling for changing state of the scheduled non-precoded pilot is sent by the base station when current state of the scheduled non-precoded pilot is not consistent with the state of the scheduled non-precoded pilot acquired by the UE according to the state information of the scheduled non-precoded pilot.

The RNC uses RRC signaling to configure the UE to 4Tx MIMO mode, and it may take up to hundreds of ms to deliver the RRC signaling. In a process of delivering the RRC signaling by the RNC to configure 4Tx MIMO mode, the base station may have changed state of its scheduled non-precoded pilot. That is to say, after the UE is configured to 4Tx MIMO mode, there may be cases where current state of the scheduled non-precoded pilot is not consistent with the state of the scheduled non-precoded pilot acquired by the UE according to the state information of the scheduled non-precoded pilot. If this does happen, the base station may send the signaling for changing state of the scheduled non-precoded pilot to the UE. The UE receives the signaling for changing state of the scheduled non-precoded pilot, and according to the signaling for changing state of the scheduled non-precoded pilot, changes state of the scheduled non-precoded pilot to be consistent with current state of the scheduled non-precoded pilot.

In the method for indicating pilot state according to this embodiment of the present invention, a UE receives 4Tx MIMO mode configuration signaling that is sent by an RNC and carries state information of a scheduled non-precoded pilot, and the UE acquires state of the scheduled non-precoded pilot according to the state information of the scheduled non-precoded pilot when being configured to 4Tx MIMO mode. By practicing the method, there is a lower probability that a base station sends HS-SCCH signaling to notify the UE about state of the scheduled non-precoded pilot, which in turn reduces physical-layer signaling overheads and reduces a scheduling delay by shortening a delay in acquiring state of the scheduled non-precoded pilot by the UE.

It should be understood that in this embodiment of the present invention, interaction between the RNC, the base station and the UE, related features and functions, and the like are described from a perspective of an RNC side or a base station side, and correspond to those described from a perspective of a UE side. For brevity, details are not repeatedly described herein.

The foregoing separately describes in detail the method for indicating pilot state from a perspective of an RNC, a base station and a UE. The following describes in detail the embodiments of the present invention with reference to specific examples. It should be noted that these examples are merely intended to help a person skilled in the art better understand the embodiments of the present invention, but not to limit the scope of the embodiments of the present invention.

Figure 9:
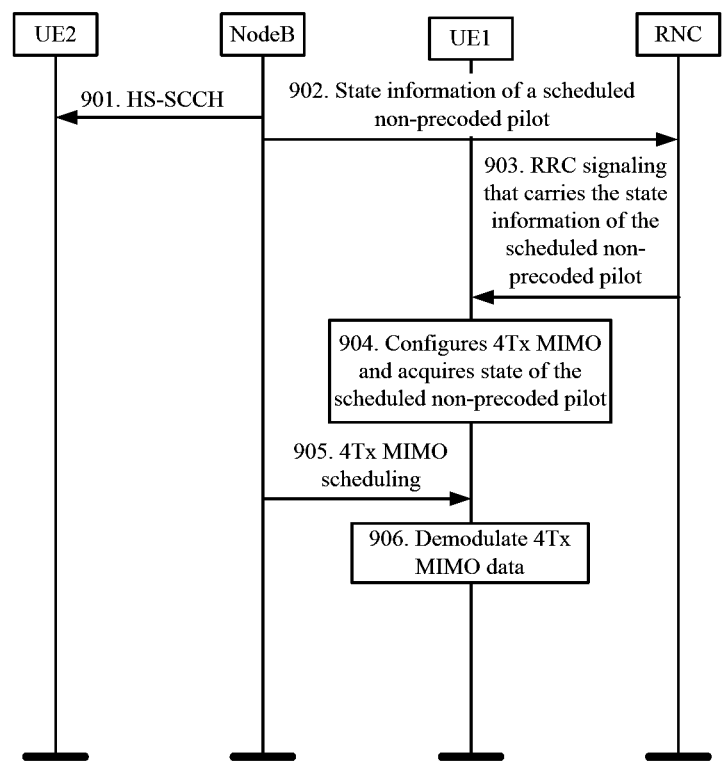
FIG. 9 is a schematic diagram of a method for indicating pilot state according to an embodiment of the present invention.

As shown in FIG. 9, a UE 2 is a UE that is already configured to 4Tx MIMO mode in a cell, and a UE 1 is a UE that is to be configured to 4Tx MIMO mode in the cell.

901. A NodeB uses HS-SCCH signaling to notify the UE 2 to change state of a scheduled non-precoded pilot. For example, according to a current condition of the entire cell, the NodeB determines that the scheduled non-precoded pilot is activated, and the NodeB notifies, by using the HS-SCCH signaling, the UE 2 that the scheduled non-precoded pilot is activated.

902. The NodeB sends state information of the scheduled non-precoded pilot to an RNC. For example, when determining that the scheduled non-precoded pilot is activated, the NodeB uses Iub interface signaling to send the state information of the scheduled non-precoded pilot to the RNC to indicate that the scheduled non-precoded pilot is activated.

903. The RNC sends RRC signaling to the UE 1 and configures the UE 1 to 4Tx MIMO mode, where the RRC signaling carries the state information of the scheduled non-precoded pilot. For example, the RNC includes into the RRC signaling the received state information of the scheduled non-precoded pilot, where the received state information indicates that the scheduled non-precoded pilot is activated.

904. The UE 1 receives the RRC signaling sent by the RNC, is configured to 4Tx MIMO mode according to the RRC signaling, and acquires state of the scheduled non-precoded pilot according to the state information of the scheduled non-precoded pilot carried in the RRC signaling. For example, according to the state information of the scheduled non-precoded pilot that indicates the scheduled non-precoded pilot is activated, the UE 1 learns that the scheduled non-precoded pilot is in activated state.

905. The NodeB uses 4Tx MIMO scheduling data when 4Tx MIMO mode is configured successfully. For example, when the scheduled non-precoded pilot is activated, the scheduled non-precoded pilot may be sent directly.

906. The UE 1 demodulates 4Tx MIMO data correspondingly. For example, if it is learned that the scheduled non-precoded pilot is in activated state, the scheduled non-precoded pilot is used to demodulate 4Tx MIMO data; if it is learned that the scheduled non-precoded pilot is in deactivated state, the scheduled non-precoded pilot is not used to demodulate 4Tx MIMO data.

Figure 10:
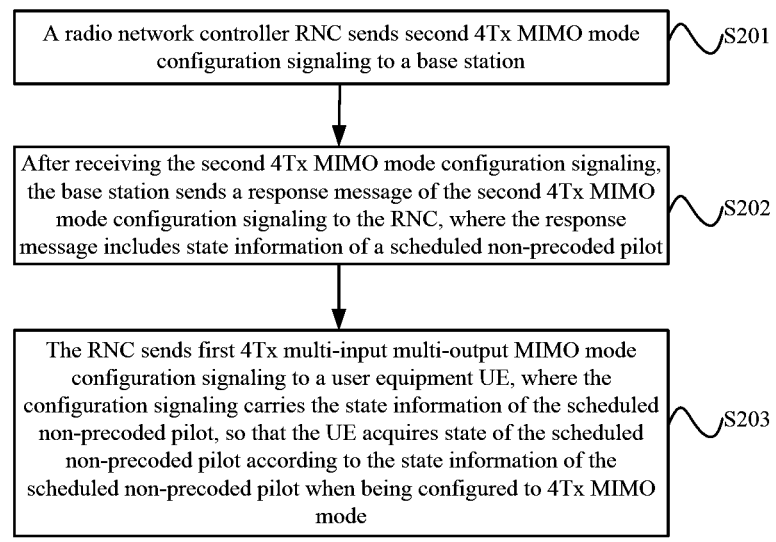
FIG. 10 is a schematic flowchart of a method for indicating pilot state according to still another embodiment of the present invention.

FIG. 10 is a schematic flowchart of a method for indicating pilot state according to still another embodiment of the present invention. The method in this embodiment is similar to the methods in the embodiments shown in FIG. 1 to FIG. 9, and a difference lies in a manner of sending state information of a scheduled non-precoded pilot by a base station. This embodiment describes only the difference, and content common in these embodiments are not repeatedly described. As shown in FIG. 10, the method includes:

S201. A radio network controller RNC sends second 4Tx MIMO mode configuration signaling to a base station. Optionally, the RNC sends a radio link setup message or a radio link addition message or a radio link reconfiguration request message or a radio link reconfiguration prepare message to the base station. The radio link setup message or the radio link addition message or the radio link reconfiguration request message or the radio link reconfiguration prepare message includes the second 4Tx MIMO mode configuration signaling.

S202. After receiving the second 4Tx MIMO mode configuration signaling, the base station sends a response message of the second 4Tx MIMO mode configuration signaling to the RNC, where the response message includes state information of a scheduled non-precoded pilot. Optionally, the base station sends a radio link setup response message or a radio link addition response message or a radio link reconfiguration response message or a radio link reconfiguration ready message to the RNC. The radio link setup response message or the radio link addition response message or the radio link reconfiguration response message or the radio link reconfiguration ready message includes the response message of the second 4Tx MIMO mode configuration signaling.

S203. The RNC sends first 4Tx multi-input multi-output MIMO mode configuration signaling to a user equipment UE, where the configuration signaling carries the state information of the scheduled non-precoded pilot, so that the UE acquires state of the scheduled non-precoded pilot according to the state information of the scheduled non-precoded pilot when being configured to 4Tx MIMO mode.

In this embodiment, after state information of a scheduled non-precoded pilot changes, a base station does not report a latest state to an RNC immediately, but waits for the RNC to send configuration signaling for configuring a user equipment to operate in 4Tx MIMO mode. A response message of the configuration signaling carries the state information of the scheduled non-precoded pilot. For example, the RNC sends a radio link setup message to the base station, and configures 4Tx MIMO configuration signaling, and after which, the base station includes the state information of the scheduled non-precoded pilot in a radio link setup response message.

Figure 11:
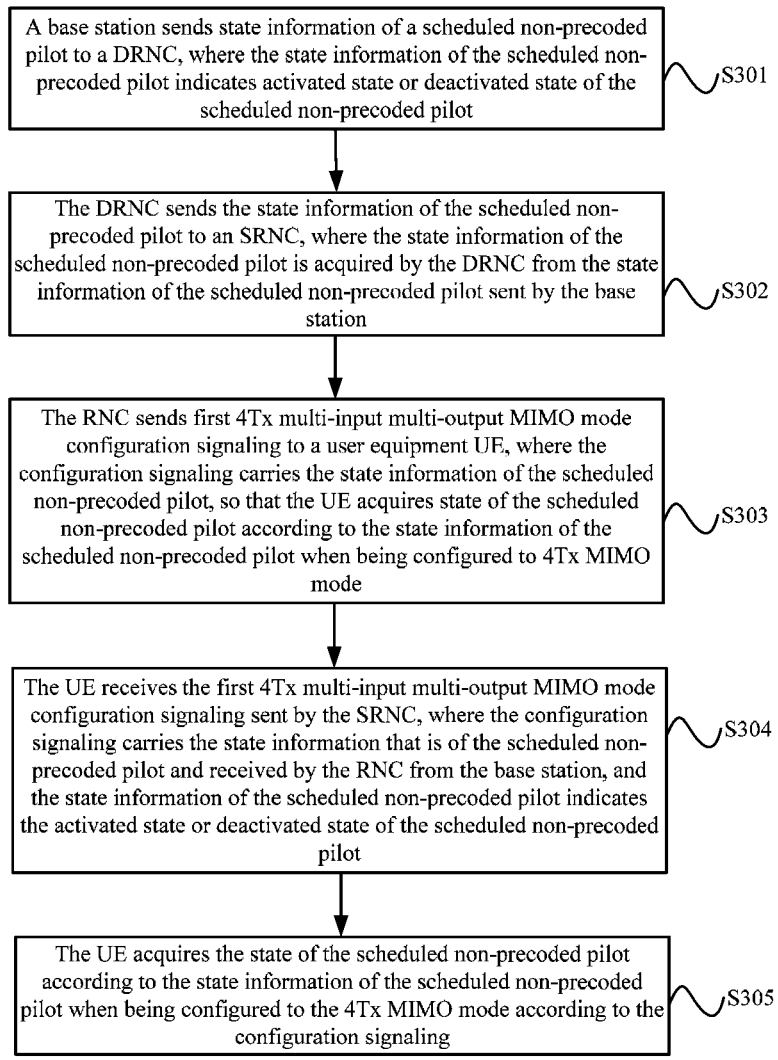
FIG. 11 is a schematic flowchart of a method for indicating pilot state according to still another embodiment of the present invention.
Figure 12:
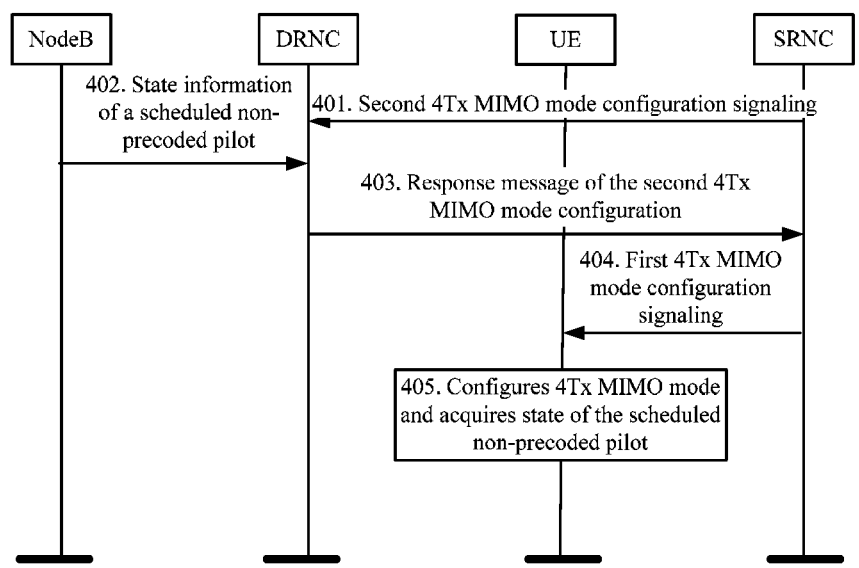
FIG. 12 is a schematic flowchart of a method for indicating pilot state according to still another embodiment of the present invention.
Figure 13:
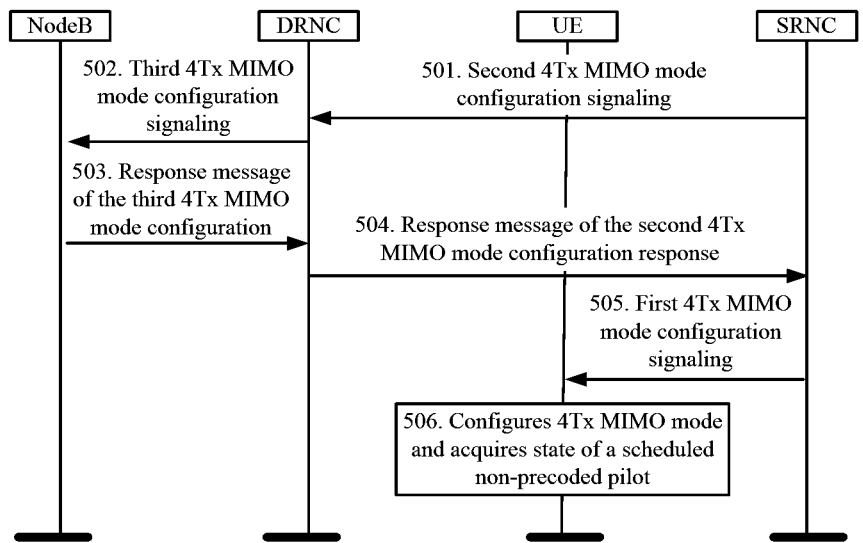
FIG. 13 is a schematic flowchart of a method for indicating pilot state according to still another embodiment of the present invention.

In each embodiment described above, the RNC is a serving radio network controller (Serving Radio Network Controller, SRNC) or a radio network controller in which an SRNC is integrated. This embodiment of the present invention may also be applied to an RNC that includes a drift radio network controller (Drift Radio Network Controller, DRNC). The SRNC and the DRNC may be two separate parts or may be integrated together. The methods in the embodiments shown in FIG. 11, FIG. 12, and FIG. 13 are similar to the methods in the embodiments shown in FIG. 1 to FIG. 10, and a difference lies in a manner of receiving state information of a scheduled non-precoded pilot by an SRNC. This embodiment describes only the difference, and content common in these embodiments are not repeatedly described.

FIG. 11 is a schematic flowchart of a method for indicating pilot state according to still another embodiment of the present invention. As shown in FIG. 11, the method includes:

S301. A base station sends state information of a scheduled non-precoded pilot to a DRNC, where the state information of the scheduled non-precoded pilot indicates activated state or deactivated state of the scheduled non-precoded pilot.

S302. The DRNC sends the state information of the scheduled non-precoded pilot to an SRNC, where the state information of the scheduled non-precoded pilot is acquired by the DRNC from the state information of the scheduled non-precoded pilot sent by the base station.

S303. The SRNC sends first 4Tx multi-input multi-output MIMO mode configuration signaling to a user equipment UE, where the configuration signaling carries the state information of the scheduled non-precoded pilot.

S304. The UE receives the first 4Tx multi-input multi-output MIMO mode configuration signaling sent by the SRNC, where the configuration signaling carries the state information of the scheduled non-precoded pilot received by the RNC from the base station, and the state information of the scheduled non-precoded pilot indicates activated state or deactivated state of the scheduled non-precoded pilot.

S305. The UE acquires state of the scheduled non-precoded pilot according to the state information of the scheduled non-precoded pilot when being configured to 4Tx MIMO mode according to the configuration signaling.

FIG. 12 is a schematic flowchart of a method for indicating pilot state according to still another embodiment of the present invention. As shown in FIG. 12, the method includes:

401. An SRNC sends second 4Tx multi-input multi-output MIMO mode configuration signaling to a DRNC. Optionally, the SRNC sends a radio link setup message or a radio link addition message or a radio link reconfiguration request message or a radio link reconfiguration prepare message to the DRNC. The radio link setup message or the radio link addition message or the radio link reconfiguration request message or the radio link reconfiguration prepare message includes the second 4Tx MIMO mode configuration signaling.

402. A base station (which is a NodeB in this embodiment) sends state information of a scheduled non-precoded pilot to the DRNC, where the state information of the scheduled non-precoded pilot indicates activated state or deactivated state of the scheduled non-precoded pilot. Specifically, the base station sends the state information of the scheduled non-precoded pilot to the DRNC after changing state of the scheduled non-precoded pilot. Optionally, the state information of the scheduled non-precoded pilot sent by the base station to the DRNC is included in a resource state indication message sent by the base station. The step 401 may be performed prior or subsequent to the step 402, which is not limited by this embodiment.

403. The DRNC sends a response message of the second 4Tx multi-input multi-output MIMO mode configuration signaling to the SRNC, where the response message includes the state information of the scheduled non-precoded pilot, and the state information of the scheduled non-precoded pilot is acquired by the DRNC from the state information of the scheduled non-precoded pilot sent by the base station. Optionally, the DRNC sends a radio link setup response message or a radio link addition response message or a radio link reconfiguration response message or a radio link reconfiguration ready message to the SRNC. The radio link setup response message or the radio link addition response message or the radio link reconfiguration response message or the radio link reconfiguration ready message includes the response message of the second 4Tx multi-input multi-output MIMO mode configuration signaling.

404. The SRNC sends first 4Tx multi-input multi-output MIMO mode configuration signaling to a UE, where the configuration signaling carries the state information of the scheduled non-precoded pilot.

405. The UE receives the first 4Tx multi-input multi-output MIMO mode configuration signaling sent by the SRNC, where the configuration signaling carries the state information of the scheduled non-precoded pilot and received by the RNC from the base station, and the state information of the scheduled non-precoded pilot indicates activated state or deactivated state of the scheduled non-precoded pilot. The UE acquires state of the scheduled non-precoded pilot according to the state information of the scheduled non-precoded pilot when being configured to 4Tx MIMO mode according to the configuration signaling.

Exemplarily, the SRNC sends a radio link setup message to the DRNC, where the radio link setup message carries the second 4Tx multi-input multi-output MIMO mode configuration signaling. After changing state of the scheduled non-precoded pilot, the base station sends a resource state indication message to the DRNC, where the resource state indication message includes the state information of the scheduled non-precoded pilot. The DRNC sends a radio link setup response message to the SRNC, where the response message includes the state information of the scheduled non-precoded pilot. The SRNC sends the first 4Tx multi-input multi-output MIMO mode configuration signaling to the UE. The UE acquires state of the scheduled non-precoded pilot according to the state information of the scheduled non-precoded pilot when being configured to 4Tx MIMO mode according to the configuration signaling.

FIG. 13 is a schematic flowchart of a method for indicating pilot state according to still another embodiment of the present invention. As shown in FIG. 13, the method includes:

501. An SRNC sends second 4Tx multi-input multi-output MIMO mode configuration signaling to a DRNC. Optionally, the SRNC sends a radio link setup message or a radio link addition message or a radio link reconfiguration request message or a radio link reconfiguration prepare message to the DRNC. The radio link setup message or the radio link addition message or the radio link reconfiguration request message or the radio link reconfiguration prepare message includes the second 4Tx MIMO mode configuration signaling.

502. The DRNC sends third 4Tx multi-input multi-output MIMO mode configuration signaling to a base station. Optionally, the DRNC sends a radio link setup message or a radio link addition message or a radio link reconfiguration request message or a radio link reconfiguration prepare message to the base station. The radio link setup message or the radio link addition message or the radio link reconfiguration request message or the radio link reconfiguration prepare message includes the third 4Tx MIMO mode configuration signaling.

503. The base station sends a response message of the third 4Tx multi-input multi-output MIMO mode configuration signaling to the DRNC, where the response message includes state information of a scheduled non-precoded pilot. Optionally, the base station sends a radio link setup response message or a radio link addition response message or a radio link reconfiguration response message or a radio link reconfiguration ready message to the DRNC. The radio link setup response message or the radio link addition response message or the radio link reconfiguration response message or the radio link reconfiguration ready message includes the response message of the third 4Tx multi-input multi-output MIMO mode configuration signaling. Specifically, after changing state of the scheduled non-precoded pilot, the base station sends the response message of the third 4Tx multi-input multi-output MIMO mode configuration signaling to the DRNC.

504. The DRNC sends a response message of the second 4Tx multi-input multi-output MIMO mode configuration signaling to the SRNC, where the response message of the second 4Tx MIMO mode configuration signaling includes the state information of the scheduled non-precoded pilot, where the state information of the scheduled non-precoded pilot included in the response message of the second 4Tx MIMO mode configuration signaling is acquired by the DRNC from the response message of the third 4Tx MIMO mode configuration signaling sent by the base station. Optionally, the DRNC sends a radio link setup response message or a radio link addition response message or a radio link reconfiguration response message or a radio link reconfiguration ready message to the SRNC. The radio link setup response message or the radio link addition response message or the radio link reconfiguration response message or the radio link reconfiguration ready message includes the response message of the second 4Tx MIMO mode configuration signaling.

505. The SRNC sends first 4Tx multi-input multi-output MIMO mode configuration signaling to a UE, where the configuration signaling carries the state information of the scheduled non-precoded pilot.

506. The UE receives the first 4Tx multi-input multi-output MIMO mode configuration signaling sent by the SRNC, where the configuration signaling carries the state information of the scheduled non-precoded pilot received by the RNC from the base station, and the state information of the scheduled non-precoded pilot indicates activated state or deactivated state of the scheduled non-precoded pilot. The UE acquires state of the scheduled non-precoded pilot according to the state information of the scheduled non-precoded pilot when being configured to 4Tx MIMO mode according to the configuration signaling.

Exemplarily, the SRNC sends a radio link setup message to the DRNC, where the radio link setup message carries the second 4Tx multi-input multi-output MIMO mode configuration signaling. The DRNC sends a radio link setup message to the base station, where the radio link setup message carries the third 4Tx multi-input multi-output MIMO mode configuration signaling. After changing state of the scheduled non-precoded pilot, the base station sends a radio link setup response message to the DRNC, where the response message includes the state information of the scheduled non-precoded pilot. The DRNC sends a radio link setup response message to the SRNC, where the response message includes the state information of the scheduled non-precoded pilot, and the state information of the scheduled non-precoded pilot is acquired by the DRNC from the response message sent by the base station. The SRNC sends the first 4Tx multi-input multi-output MIMO mode configuration signaling to the UE. The UE acquires state of the scheduled non-precoded pilot according to the state information of the scheduled non-precoded pilot when being configured to 4Tx MIMO mode according to the configuration signaling.

Figure 14:
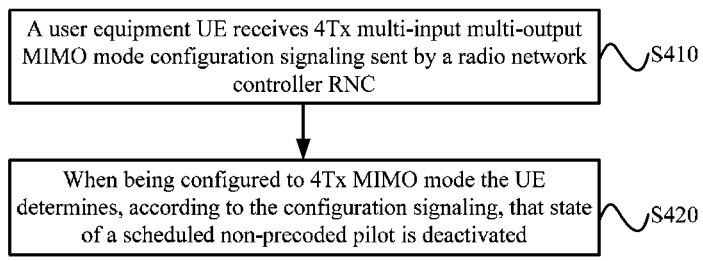
FIG. 14 is a schematic flowchart of a method for indicating pilot state according to still another embodiment of the present invention.
Figure 15:
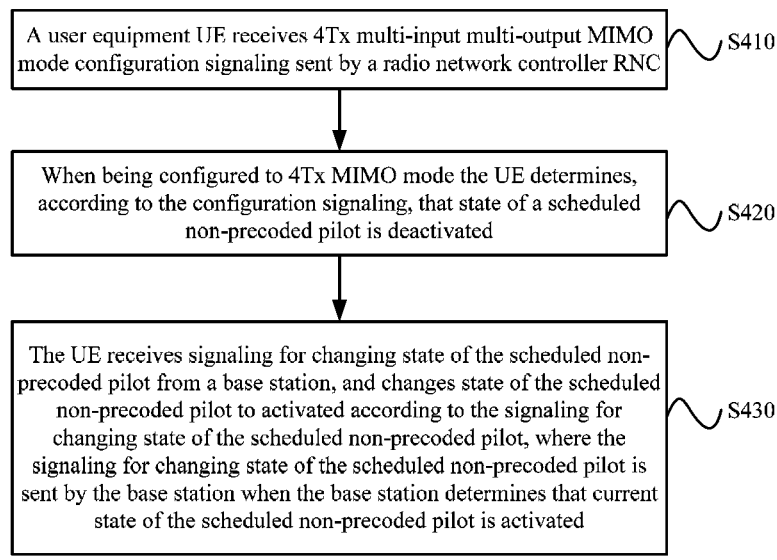
FIG. 15 is another schematic flowchart of a method for indicating pilot state according to still another embodiment of the present invention.
Figure 16:
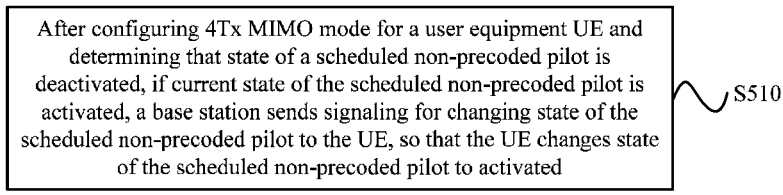
FIG. 16 is a schematic flowchart of a method for indicating pilot state according to still another embodiment of the present invention.

With reference to FIG. 14 to FIG. 16, the following describes in detail another method for indicating pilot state.

FIG. 14 is a schematic flowchart of a method 400 for indicating pilot state according to still another embodiment of the present invention. As shown in FIG. 14, the method 400 includes:

S410. A user equipment UE receives 4Tx multi-input multi-output MIMO mode configuration signaling sent by a radio network controller RNC.

S420. When being configured to 4Tx MIMO mode according to the configuration signaling, the UE determines that state of a scheduled non-precoded pilot is deactivated.

In this embodiment of the present invention, when being configured to 4Tx MIMO mode, the UE determines that state of the scheduled non-precoded pilot is deactivated, which means that the UE determines that initial state of the scheduled non-precoded pilot is deactivated. When current state of the scheduled non-precoded pilot is deactivated, a base station does not need to send HS-SCCH signaling to notify the UE about state of the scheduled non-precoded pilot.

In the method for indicating pilot state according to this embodiment of the present invention, when being configured to 4Tx MIMO mode, a UE determines that state of a scheduled non-precoded pilot is deactivated. By practicing the method, there is a lower probability that a base station sends HS-SCCH signaling to notify the UE about state of the scheduled non-precoded pilot, which in turn reduces physical-layer signaling overheads and reduces a delay in acquiring state of the scheduled non-precoded pilot by the UE in 4Tx MIMO mode.

In this embodiment of the present invention, as shown in FIG. 15, optionally, after S420, the method 400 further includes:

S430. The UE receives signaling for changing state of the scheduled non-precoded pilot from a base station, and changes state of the scheduled non-precoded pilot to activated according to the signaling for changing state of the scheduled non-precoded pilot, where the signaling for changing state of the scheduled non-precoded pilot is sent by the base station when the base station determines that current state of the scheduled non-precoded pilot is activated.

After the UE determines that state of the scheduled non-precoded pilot is deactivated, if current state of the scheduled non-precoded pilot is deactivated, the base station does not need to send HS-SCCH signaling to notify the UE about state of the scheduled non-precoded pilot, and the base station may use 4Tx MIMO scheduling data immediately, and correspondingly, the UE may not use the scheduled non-precoded pilot for demodulation. If current state of the scheduled non-precoded pilot is activated, the base station needs to send the signaling for changing state of the scheduled non-precoded pilot to the UE. In other words, the base station sends HS-SCCH signaling to notify the UE that state of the scheduled non-precoded pilot is activated. According to the signaling for changing state of the scheduled non-precoded pilot, the UE changes state of the scheduled non-precoded pilot to be activated.

The foregoing describes in detail the method for indicating pilot state with reference to FIG. 14 to FIG. 15 from a perspective of a UE. The following describes in detail the method for indicating pilot state with reference to FIG. 16 from a perspective of a base station.

FIG. 16 is a schematic flowchart of a method 500 for indicating pilot state according to still another embodiment of the present invention. As shown in FIG. 16, the method 500 includes:

S510. After a user equipment UE is configured to 4Tx MIMO mode and determines that state of a scheduled non-precoded pilot is deactivated, if current state of the scheduled non-precoded pilot is activated, the base station sends signaling for changing state of the scheduled non-precoded pilot to the UE, so that the UE changes state of the scheduled non-precoded pilot to activated.

In this embodiment of the present invention, when being configured to 4Tx MIMO mode, a UE determines that state of a scheduled non-precoded pilot is deactivated. If current state of the scheduled non-precoded pilot is deactivated, a base station does not need to send HS-SCCH signaling to notify the UE about state of the scheduled non-precoded pilot; or if current state of the scheduled non-precoded pilot is activated, the base station sends signaling for changing state of the scheduled non-precoded pilot to the UE, in other words, the base station sends HS-SCCH signaling to notify the UE that state of the scheduled non-precoded pilot is activated, so that the UE changes state of the scheduled non-precoded pilot to activated according to the signaling for changing state of the scheduled non-precoded pilot.

It should be understood that in this embodiment of the present invention, interaction between the base station and the UE, related features and functions, and the like are described from a perspective of a UE side, and correspond to those described from a perspective of a base station side. For brevity, details are not repeatedly described herein.

The following describes this embodiment of the present invention in detail with reference to specific examples. It should be noted that these examples are merely intended to help a person skilled in the art better understand the embodiments of the present invention, but not to limit the scope of the embodiments of the present invention.

For example, a UE 1 that is already configured to 4Tx MIMO mode exists in a cell. According to a current condition of the entire cell, a NodeB determines to deactivate a scheduled non-precoded pilot, and the NodeB uses HS-SCCH signaling to notify the UE 1 that the scheduled non-precoded pilot is deactivated. When an RNC configures a UE 2 to 4Tx MIMO mode, the UE 2 initially considers that the scheduled non-precoded pilot is deactivated. Because a default value for the UE 2 is consistent with a current state, the base station does not need to send HS-SCCH signaling to notify the UE 2 that the scheduled non-precoded pilot is deactivated. Then, if the NodeB determines to change state of the scheduled non-precoded pilot to activated, the NodeB notifies, by using HS-SCCH signaling, the UE 1 and the UE 2 that the scheduled non-precoded pilot is activated. When the RNC configures a UE 3 to 4Tx MIMO mode, the UE 3 initially considers that the scheduled non-precoded pilot is deactivated. Because a default value for the UE 3 is not consistent with the current state, the base station needs to send HS-SCCH signaling to notify the UE 3 that the scheduled non-precoded pilot is activated.

In the method for indicating pilot state according to this embodiment of the present invention, when being configured to 4Tx MIMO mode, a UE determines that state of a scheduled non-precoded pilot is deactivated. By practicing the method, there is a lower probability that a base station sends HS-SCCH signaling to notify the UE about state of the scheduled non-precoded pilot, which in turn reduces physical-layer signaling overheads and reduces a delay in acquiring state of the scheduled non-precoded pilot by the UE in 4Tx MIMO mode.

Figure 17:
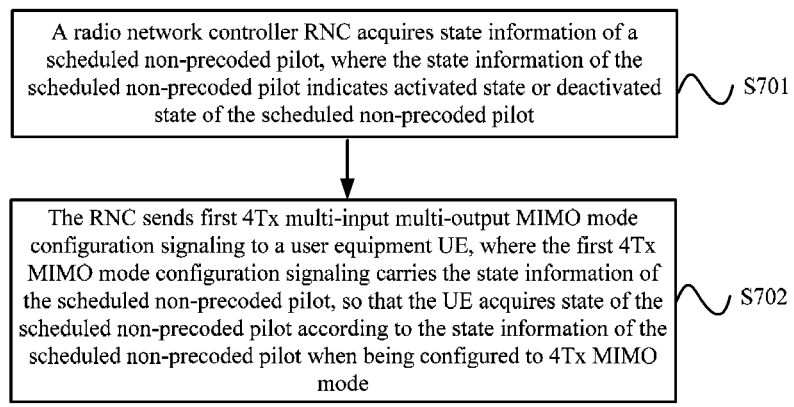
FIG. 17 is a schematic flowchart of a method for indicating pilot state according to still another embodiment of the present invention.

FIG. 17 is a schematic flowchart of a method for indicating pilot state according to still another embodiment of the present invention. As shown in FIG. 17, the method includes:

S701. A radio network controller RNC acquires state information of a scheduled non-precoded pilot, where the state information of the scheduled non-precoded pilot indicates activated state or deactivated state of the scheduled non-precoded pilot.

S702. The RNC sends first 4Tx multi-input multi-output MIMO mode configuration signaling to a user equipment UE, where the first 4Tx MIMO mode configuration signaling carries the state information of the scheduled non-precoded pilot, so that the UE acquires state of the scheduled non-precoded pilot according to the state information of the scheduled non-precoded pilot when being configured to 4Tx MIMO mode.

Optionally, the RNC is a serving radio network controller SRNC, and the acquiring, by an RNC, state information of a scheduled non-precoded pilot includes: receiving, by the SRNC, the state information of the scheduled non-precoded pilot from a base station; or, receiving, by the SRNC, the state information of the scheduled non-precoded pilot from a drift radio network controller DRNC, where the state information of the scheduled non-precoded pilot is acquired by the DRNC from state information of the scheduled non-precoded pilot sent by a base station.

Optionally, the RNC is a serving radio network controller SRNC, and the acquiring, by an RNC, state information of a scheduled non-precoded pilot includes: sending, by the SRNC, second 4Tx MIMO mode configuration signaling to a base station; and receiving, by the SRNC, a response message of the second 4Tx MIMO mode configuration signaling from the base station, where the response message of the second 4Tx MIMO mode configuration signaling includes the state information of the scheduled non-precoded pilot.

Optionally, the RNC is a serving radio network controller SRNC, and the acquiring, by an RNC, state information of a scheduled non-precoded pilot includes: sending, by the SRNC, second 4Tx MIMO mode configuration signaling to a drift radio network controller DRNC, so that the DRNC sends third 4Tx MIMO mode configuration signaling to a base station; and receiving, by the SRNC, a response message of the second 4Tx MIMO mode configuration signaling from the DRNC, where the response message of the second 4Tx MIMO mode configuration signaling includes the state information of the scheduled non-precoded pilot, where the state information of the scheduled non-precoded pilot included in the response message of the second 4Tx MIMO mode configuration signaling is acquired by the DRNC from a response message sent by the base station in response to the third 4Tx MIMO mode configuration signaling.

Optionally, the RNC is a serving radio network controller SRNC, and the acquiring, by an RNC, state information of a scheduled non-precoded pilot includes: sending, by the SRNC, second 4Tx MIMO mode configuration signaling to a drift radio network controller DRNC; and receiving, by the SRNC, a response message of the second 4Tx MIMO mode configuration signaling from the DRNC, where the response message of the second 4Tx MIMO mode configuration signaling includes the state information of the scheduled non-precoded pilot, where the state information of the scheduled non-precoded pilot is acquired by the DRNC from state information that is of the scheduled non-precoded pilot and sent by a base station.

Optionally, the state information of the scheduled non-precoded pilot sent by the base station is included in a resource state indication message sent by the base station.

Optionally, the state information of the scheduled non-precoded pilot sent by the base station is state information of the scheduled non-precoded pilot sent after the base station changes state of the scheduled non-precoded pilot.

Optionally, the second 4Tx MIMO mode configuration signaling is included in a radio link setup message or a radio link addition message or a radio link reconfiguration request message or a radio link reconfiguration prepare message.

Optionally, the response message of the second 4Tx MIMO mode configuration signaling is included in a radio link setup response message or a radio link addition response message or a radio link reconfiguration response message or a radio link reconfiguration ready message.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The foregoing describes in detail, with reference to FIG. 1 to FIG. 17, the method for indicating pilot state according to the embodiments of the present invention; the following describes, with reference to FIG. 18 to FIG. 22, a radio network controller, a base station, and a user equipment according to an embodiment of the present invention.

Figure 18:
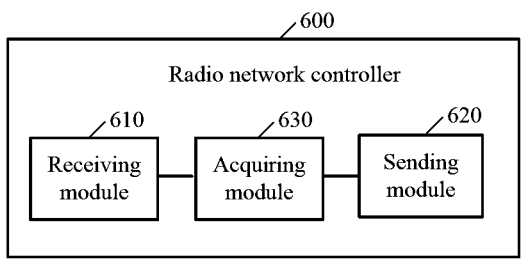
FIG. 18 is a schematic block diagram of a radio network controller according to an embodiment of the present invention.

FIG. 18 is a schematic block diagram of a radio network controller 600 according to an embodiment of the present invention. As shown in FIG. 18, the radio network controller 600 includes:

an acquiring module 630, configured to acquire state information of a scheduled non-precoded pilot, where the state information of the scheduled non-precoded pilot indicates activated state or deactivated state of the scheduled non-precoded pilot; and a sending module 620, configured to send first 4Tx multi-input multi-output MIMO mode configuration signaling to a user equipment UE, where the first 4Tx multi-input multi-output MIMO mode configuration signaling carries the state information of the scheduled non-precoded pilot, so that the UE acquires state of the scheduled non-precoded pilot according to the state information of the scheduled non-precoded pilot when being configured to 4Tx MIMO mode.

In this embodiment of the present invention, optionally, the radio network controller further includes a receiving module 610. The receiving module 610 is configured to receive the state information of the scheduled non-precoded pilot from a base station; or, the receiving module 610 is configured to receive the state information of the scheduled non-precoded pilot from a drift radio network controller DRNC, where the state information of the scheduled non-precoded pilot is acquired by the DRNC from state information that is of the scheduled non-precoded pilot and sent by a base station. The acquiring module 630 is specifically configured to acquire the state information of the scheduled non-precoded pilot from the state information of the scheduled non-precoded pilot received by the receiving module 610.

In this embodiment of the present invention, optionally, the radio network controller 600 further includes a receiving module 610. The sending module 620 is further configured to send second 4Tx MIMO mode configuration signaling to a base station. The receiving module 610 is configured to receive a response message of the second 4Tx MIMO mode configuration signaling from the base station, where the response message of the second 4Tx MIMO mode configuration signaling includes the state information of the scheduled non-precoded pilot. The acquiring module 630 is specifically configured to acquire the state information of the scheduled non-precoded pilot from the response message received by the receiving module 610.

In this embodiment of the present invention, optionally, the radio network controller 600 further includes a receiving module 610. The sending module 620 is further configured to send second 4Tx MIMO mode configuration signaling to a drift radio network controller DRNC, so that the DRNC sends third 4Tx MIMO mode configuration signaling to a base station. The receiving module 610 is configured to receive a response message of the second 4Tx MIMO mode configuration signaling from the DRNC, where the response message of the second 4Tx MIMO mode configuration signaling includes the state information of the scheduled non-precoded pilot, where the state information of the scheduled non-precoded pilot is acquired by the DRNC from a response message sent by the base station in response to the third 4Tx MIMO mode configuration signaling. The acquiring module 630 is specifically configured to acquire the state information of the scheduled non-precoded pilot from the response message received by the receiving module 610.

In this embodiment of the present invention, optionally, the radio network controller 600 further includes a receiving module 610. The sending module 620 is further configured to send second 4Tx MIMO mode configuration signaling to a drift radio network controller DRNC. The receiving module 610 is configured to receive a response message of the second 4Tx MIMO mode configuration signaling from the DRNC, where the response message of the second 4Tx MIMO mode configuration signaling includes the state information of the scheduled non-precoded pilot, where the state information of the scheduled non-precoded pilot is acquired by the DRNC from state information of the scheduled non-precoded pilot sent by a base station. The acquiring module 630 is specifically configured to acquire the state information of the scheduled non-precoded pilot from the response message received by the receiving module 610.

In this embodiment of the present invention, optionally, the receiving module 610 is specifically configured to receive a resource state indication message sent by a base station, where the resource state indication message includes the state information of the scheduled non-precoded pilot. The acquiring module 630 is specifically configured to acquire the state information of the scheduled non-precoded pilot from the resource state indication message.

In this embodiment of the present invention, optionally, the receiving module 610 is specifically configured to: after the base station changes state of the scheduled non-precoded pilot, receive the state information of the scheduled non-precoded pilot from the base station. After changing state of the scheduled non-precoded pilot, the base station sends the state information of the scheduled non-precoded pilot to the RNC to notify the RNC about latest state of the scheduled non-precoded pilot. In this way, when the RNC configures 4Tx MIMO for a subsequent UE, the receiving module 620 can transmit current state of the scheduled non-precoded pilot to the UE.

In this embodiment of the present invention, optionally, the sending module 620 is specifically configured to send a radio link setup message or a radio link addition message or a radio link reconfiguration request message or a radio link reconfiguration prepare message to the DRNC, where the second 4Tx MIMO mode configuration signaling is included in the radio link setup message or the radio link addition message or the radio link reconfiguration request message or the radio link reconfiguration prepare message.

In this embodiment of the present invention, optionally, the receiving module 620 is specifically configured to receive a radio link setup response message or a radio link addition response message or a radio link reconfiguration response message or a radio link reconfiguration ready message sent by the DRNC. The response message of the second 4Tx MIMO mode configuration signaling is included in a radio link setup response message or a radio link addition response message or a radio link reconfiguration response message or a radio link reconfiguration ready message. The acquiring module 630 is specifically configured to acquire the state information of the scheduled non-precoded pilot from the radio link setup response message or the radio link addition response message or the radio link reconfiguration response message or the radio link reconfiguration ready message.

In this embodiment of the present invention, optionally, the radio network controller 600 is an SRNC.

In this embodiment of the present invention, to enable the UE to learn state of the scheduled non-precoded pilot when the UE is configured to first 4Tx MIMO mode, the acquiring module 630 acquires the state information of the scheduled non-precoded pilot, where the state information of the scheduled non-precoded pilot indicates activated state or deactivated state of the scheduled non-precoded pilot. Then, the sending module 620 sends, to the UE, first 4Tx MIMO mode configuration signaling that carries the state information of the scheduled non-precoded pilot, so that the UE acquires state of the scheduled non-precoded pilot according to the state information of the scheduled non-precoded pilot when being configured to 4Tx MIMO mode. In this way, the base station does not need to send HS-SCCH signaling to notify the UE about activated or deactivated state of the scheduled non-precoded pilot. Rather, the UE can acquire state of the scheduled non-precoded pilot from the state information of the scheduled non-precoded pilot when being configured to 4Tx MIMO mode.

The radio network controller according to this embodiment of the present invention sends, to a UE, first 4Tx MIMO mode configuration signaling that carries state information of a scheduled non-precoded pilot, so that the UE may acquire state of the scheduled non-precoded pilot according to the state information of the scheduled non-precoded pilot when being configured to 4Tx MIMO mode, where the state information of the scheduled non-precoded pilot is acquired by the RNC. In this way, sending HS-SCCH signaling by a base station to notify the UE about state of the scheduled non-precoded pilot is avoided to reduce physical-layer signaling overheads and to reduce a delay in acquiring state of the scheduled non-precoded pilot by the UE in 4Tx MIMO mode.

The radio network controller 600 according to this embodiment of the present invention may correspond to the radio network controller in the method for indicating pilot state according to the foregoing embodiments of the present invention, and the foregoing and other operations and/or functions of each module in the radio network controller 600 are intended to separately implement corresponding processes of the methods in FIG. 1 to FIG. 13. For brevity, details are not repeatedly described herein.

Figure 19:
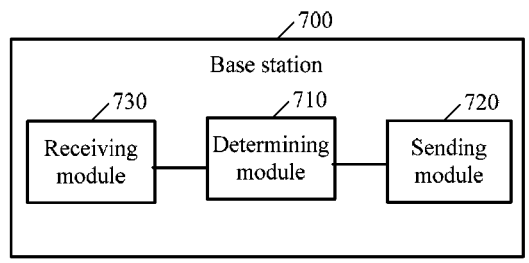
FIG. 19 is a schematic block diagram of a base station according to an embodiment of the present invention.

FIG. 19 is a schematic block diagram of a base station 700 according to an embodiment of the present invention. As shown in FIG. 19, the base station 700 includes:

a determining module 710, configured to determine state information of a scheduled non-precoded pilot, where the state information of the scheduled non-precoded pilot indicates activated state or deactivated state of the scheduled non-precoded pilot; and a sending module 720, configured to send the state information of the scheduled non-precoded pilot to a radio network controller RNC, so that the RNC sends, to a first user equipment UE, first 4Tx multi-input multi-output MIMO mode configuration signaling that carries the state information of the scheduled non-precoded pilot, and the first UE acquires state of the scheduled non-precoded pilot according to the state information of the scheduled non-precoded pilot when being configured to 4Tx MIMO mode.

In this embodiment of the present invention, the first UE is a UE that is to be configured to 4Tx MIMO mode. To enable the first UE to learn state of the scheduled non-precoded pilot when the first UE is configured to 4Tx MIMO mode, the sending module 720 sends the state information of the scheduled non-precoded pilot to the RNC. Then, the RNC sends the first 4Tx multi-input multi-output MIMO mode configuration signaling that carries the state information of the scheduled non-precoded pilot to the first UE, so that the first UE acquires state of the scheduled non-precoded pilot according to the state information of the scheduled non-precoded pilot when being configured to 4Tx MIMO mode. In this way, the base station does not need to send HS-SCCH signaling to notify the UE about activated or deactivated state of the scheduled non-precoded pilot. In addition, the base station may use 4Tx MIMO scheduling data when 4Tx MIMO mode is configured successfully, and according to the learned activated state or deactivated state of the scheduled non-precoded pilot, the first UE may also use or not use the scheduled non-precoded pilot correspondingly to demodulate 4Tx MIMO data, thereby reducing a scheduling delay.

The base station according to this embodiment of the present invention sends state information of a scheduled non-precoded pilot to an RNC, so that the RNC sends, to a UE, first 4Tx MIMO mode configuration signaling that carries the state information of the scheduled non-precoded pilot, and the UE acquires state of the scheduled non-precoded pilot according to the state information of the scheduled non-precoded pilot when being configured to 4Tx MIMO mode. In this way, sending HS-SCCH signaling by the base station to notify the UE about state of the scheduled non-precoded pilot is avoided to reduce physical-layer signaling overheads and to reduce a delay in acquiring state of the scheduled non-precoded pilot by the UE in 4Tx MIMO mode.

In this embodiment of the present invention, optionally, the sending module 720 is further configured to: before the determining module 710 determines the state information of the scheduled non-precoded pilot, notify a second UE to change state of the scheduled non-precoded pilot, where the second UE is a UE that is already configured to 4Tx MIMO mode.

When the base station determines that state of the scheduled non-precoded pilot is changed, the base station uses HS-SCCH signaling to notify the second UE to change state of the scheduled non-precoded pilot, where the second UE is a UE that is already configured to 4Tx MIMO mode. In addition, the base station sends the state information of the scheduled non-precoded pilot to the RNC, so that latest state of the scheduled non-precoded pilot is notified to the RNC. In this way, when configuring 4Tx MIMO for the first UE, the RNC can transmit current state of the scheduled non-precoded pilot to the UE.

In this embodiment of the present invention, optionally, the sending module 720 is further configured to: after sending the state information of the scheduled non-precoded pilot to the radio network controller RNC and when current state of the scheduled non-precoded pilot is not consistent with the state of the scheduled non-precoded pilot acquired by the first UE according to the state information of the scheduled non-precoded pilot, notify the first UE to change state of the scheduled non-precoded pilot.

In this embodiment of the present invention, optionally, the RNC is a serving radio network controller SRNC, and the sending module 720 is specifically configured to send the state information of the scheduled non-precoded pilot to the SRNC directly; or the sending module 720 is specifically configured to send the state information of the scheduled non-precoded pilot to the SRNC through a drift radio network controller DRNC.

In this embodiment of the present invention, optionally, the RNC is a serving radio network controller SRNC, and the base station further includes a receiving module 730. The receiving module 730 is configured to receive second 4Tx MIMO mode configuration signaling sent by the SRNC; and the sending module 720 is specifically configured to send a response message of the second 4Tx MIMO mode configuration signaling to the SRNC, where the response message includes the state information of the scheduled non-precoded pilot.

In this embodiment of the present invention, optionally, the RNC is a serving radio network controller SRNC, and the sending module 720 is specifically configured to send the state information of the scheduled non-precoded pilot to a drift radio network controller DRNC, so that after the DRNC receives second 4Tx MIMO mode configuration signaling sent by the SRNC, the DRNC sends a response message of the second 4Tx MIMO mode configuration signaling to the SRNC, where the response message includes the state information of the scheduled non-precoded pilot. The state information of the scheduled non-precoded pilot included in the response message is acquired by the DRNC from the state information that is of the scheduled non-precoded pilot and sent by the sending module.

In this embodiment of the present invention, optionally, the RNC is a serving radio network controller SRNC, and the base station further includes a receiving module 730. The receiving module 730 is configured to receive third 4Tx MIMO mode configuration signaling sent by a drift radio network controller DRNC, where the third 4Tx MIMO mode configuration signaling is sent after the DRNC receives second 4Tx MIMO mode configuration signaling sent by the SRNC; and the sending module 720 is specifically configured to send a response message of the third 4Tx MIMO mode configuration signaling to the DRNC, so that the DRNC sends a response message of the second 4Tx MIMO mode configuration signaling to the SRNC, where both the response message of the second 4Tx MIMO mode configuration signaling and the response message of the third 4Tx MIMO mode configuration signaling include the state information of the scheduled non-precoded pilot, where the state information of the scheduled non-precoded pilot and included in the response message of the second 4Tx MIMO mode configuration signaling is acquired by the DRNC from the response message of the third 4Tx MIMO mode configuration signaling.

In this embodiment of the present invention, optionally, the sending module 720 sends the state information of the scheduled non-precoded pilot to the RNC after the base station changes state of the scheduled non-precoded pilot.

In this embodiment of the present invention, optionally, the sending module 720 is specifically configured to send a resource state indication message, where the sent resource state indication message includes the state information of the scheduled non-precoded pilot.

In this embodiment of the present invention, optionally, the receiving module 730 is specifically configured to receive a radio link setup message or a radio link addition message or a radio link reconfiguration request message or a radio link reconfiguration prepare message, where the radio link setup message or the radio link addition message or the radio link reconfiguration request message or the radio link reconfiguration prepare message includes the second 4Tx MIMO mode configuration signaling.

In this embodiment of the present invention, optionally, the sending module 730 is specifically configured to send a radio link setup response message or a radio link addition response message or a radio link reconfiguration response message or a radio link reconfiguration ready message, where the radio link setup response message or the radio link addition response message or the radio link reconfiguration response message or the radio link reconfiguration ready message includes the response message of the second 4Tx MIMO mode configuration signaling.

The base station 700 according to this embodiment of the present invention may correspond to the base station in the method for indicating pilot state according to the foregoing embodiments of the present invention, and the foregoing and other operations and/or functions of each module in the base station 700 are intended to separately implement corresponding processes of the methods in FIG. 1 to FIG. 13. For brevity, details are not repeatedly described herein.

Figure 20:
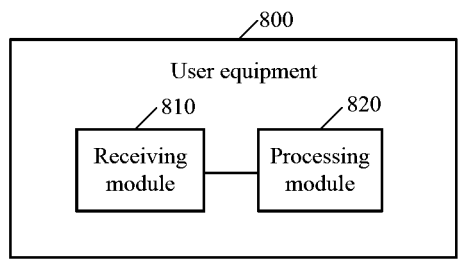
FIG. 20 is a schematic block diagram of a user equipment according to an embodiment of the present invention.

FIG. 20 is a schematic block diagram of a user equipment 800 according to an embodiment of the present invention. As shown in FIG. 20, the user equipment 800 includes:

a receiving module 810, configured to receive 4Tx multi-input multi-output MIMO mode configuration signaling sent by a radio network controller RNC, where the configuration signaling carries state information that is of a scheduled non-precoded pilot and acquired by the RNC, and the state information of the scheduled non-precoded pilot indicates activated state or deactivated state of the scheduled non-precoded pilot; and a processing module 820, configured to acquire state of the scheduled non-precoded pilot according to the state information of the scheduled non-precoded pilot when being configured to 4Tx MIMO mode according to the configuration signaling.

In this embodiment of the present invention, after a base station sends the state information of the scheduled non-precoded pilot to the RNC, the receiving module 810 receives the 4Tx MIMO mode configuration signaling sent by the RNC, where the configuration signaling carries the state information of the scheduled non-precoded pilot. Then, the processing module 820 configures 4Tx MIMO mode according to the configuration signaling, and acquires state of the scheduled non-precoded pilot according to the state information of the scheduled non-precoded pilot. In this way, the UE can acquire state of the scheduled non-precoded pilot when being configured to 4Tx MIMO mode. Therefore, the base station does not need to send HS-SCCH signaling to notify the UE about activated or deactivated state of the scheduled non-precoded pilot.

The user equipment according to this embodiment of the present invention receives 4Tx MIMO mode configuration signaling that is sent by an RNC and carries state information of a scheduled non-precoded pilot, and acquires state of the scheduled non-precoded pilot according to the state information of the scheduled non-precoded pilot when being configured to 4Tx MIMO mode. In this way, sending HS-SCCH signaling by a base station to notify the UE about state of the scheduled non-precoded pilot is avoided to reduce physical-layer signaling overheads and to reduce a delay in acquiring state of the scheduled non-precoded pilot by the UE in 4Tx MIMO mode.

In this embodiment of the present invention, optionally, the state information of the scheduled non-precoded pilot is sent after the base station changes state of the scheduled non-precoded pilot.

In this embodiment of the present invention, optionally, the receiving module 810 is further configured to: after the processing module 820 acquires state of the scheduled non-precoded pilot according to the state information of the scheduled non-precoded pilot, receive signaling for changing state of the scheduled non-precoded pilot from the base station, and the processing module 820 is further configured to change state of the scheduled non-precoded pilot according to the signaling for changing state of the scheduled non-precoded pilot, where the signaling for changing state of the scheduled non-precoded pilot is sent by the base station when current state of the scheduled non-precoded pilot is not consistent with the state of the scheduled non-precoded pilot acquired by the user equipment according to the state information of the scheduled non-precoded pilot.

The user equipment 800 according to this embodiment of the present invention may correspond to the user equipment in the method for indicating pilot state according to the foregoing embodiments of the present invention, and the foregoing and other operations and/or functions of each module in the user equipment 800 are intended to separately implement corresponding processes of the methods in FIG. 1 to FIG. 13. For brevity, details are not repeatedly described herein.

Figure 21:
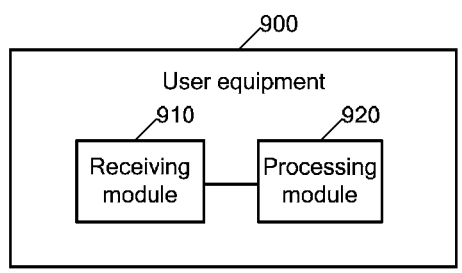
FIG. 21 is a schematic block diagram of a user equipment according to another embodiment of the present invention.

FIG. 21 is a schematic block diagram of a user equipment 900 according to another embodiment of the present invention. As shown in FIG. 21, the user equipment 900 includes:

a receiving module 910, configured to receive 4Tx multi-input multi-output MIMO mode configuration signaling sent by a radio network controller RNC; and a processing module 920, configured to: when being configured to 4Tx MIMO mode according to the configuration signaling, determine that state of a scheduled non-precoded pilot is deactivated.

In this embodiment of the present invention, when being configured to 4Tx MIMO mode, the processing module 920 determines that state of the scheduled non-precoded pilot is deactivated, which means that the UE determines initial state of the scheduled non-precoded pilot is deactivated. When current state of the scheduled non-precoded pilot is deactivated, a base station does not need to send HS-SCCH signaling to notify the UE about state of the scheduled non-precoded pilot.

When being configured to 4Tx MIMO mode, the user equipment according to this embodiment of the present invention determines that state of a scheduled non-precoded pilot is deactivated. In which case, there is a lower probability that a base station sends HS-SCCH signaling to notify the UE about state of the scheduled non-precoded pilot, which in turn reduces physical-layer signaling overheads and reduces a delay in acquiring state of the scheduled non-precoded pilot by the UE in 4Tx MIMO mode.

In this embodiment of the present invention, optionally, the receiving module 910 is further configured to: after the processing module 920 determines that state of the scheduled non-precoded pilot is deactivated, receive signaling for changing state of the scheduled non-precoded pilot from the base station; and the processing module 920 is further configured to change state of the scheduled non-precoded pilot to activated according to the signaling for changing state of the scheduled non-precoded pilot, where the signaling for changing state of the scheduled non-precoded pilot is sent when the base station determines that current state of the scheduled non-precoded pilot is activated.

The user equipment 900 according to this embodiment of the present invention may correspond to the user equipment in the method for indicating pilot state according to the foregoing embodiments of the present invention, and the foregoing and other operations and/or functions of each module in the user equipment 900 are intended to separately implement corresponding processes of the methods in FIG. 14 to FIG. 16. For brevity, details are not repeatedly described herein.

Figure 22:
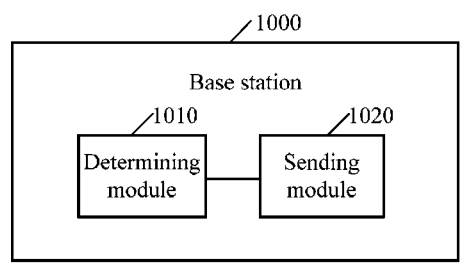
FIG. 22 is a schematic block diagram of a base station according to another embodiment of the present invention.

FIG. 22 is a schematic block diagram of a base station 1000 according to another embodiment of the present invention. As shown in FIG. 22, the base station 1000 includes:

a determining module 1010, configured to: after a user equipment UE is configured to 4Tx MIMO mode and determines that state of a scheduled non-precoded pilot is deactivated, determine that current state of the scheduled non-precoded pilot is activated; and a sending module 1020, configured to send signaling for changing state of the scheduled non-precoded pilot to the UE so that the UE changes state of the scheduled non-precoded pilot to be activated.

In this embodiment of the present invention, when being configured to 4Tx MIMO mode, the UE determines that state of the scheduled non-precoded pilot is deactivated. Then, if the determining module 1010 determines that current state of the scheduled non-precoded pilot is deactivated, the base station does not need to send HS-SCCH signaling to notify the UE about state of the scheduled non-precoded pilot; or if the determining module 1010 determines that current state of the scheduled non-precoded pilot is activated, the sending module 1020 sends the signaling for changing state of the scheduled non-precoded pilot to the UE, that is to say, the determining module 1010 sends HS-SCCH signaling to notify the UE that state of the scheduled non-precoded pilot is activated, so that the UE changes state of the scheduled non-precoded pilot to activated according to the signaling for changing state of the scheduled non-precoded pilot.

The base station 1000 according to this embodiment of the present invention may correspond to the base station in the method for indicating pilot state according to the foregoing embodiments of the present invention, and the foregoing and other operations and/or functions of each module in the base station 1000 are intended to separately implement corresponding processes of the methods in FIG. 14 to FIG. 16. For brevity, details are not repeatedly described herein.

Figure 23:
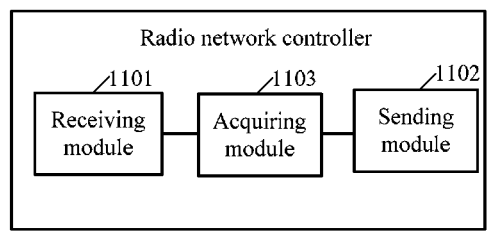
FIG. 23 is a schematic block diagram of a radio network controller according to another embodiment of the present invention.

FIG. 23 is a schematic block diagram of a radio network controller according to still another embodiment of the present invention. As shown in FIG. 23, the radio network controller includes: an acquiring module 1103, configured to acquire state information of a scheduled non-precoded pilot from state information that is of the scheduled non-precoded pilot and sent by a base station, where the acquired state information of the scheduled non-precoded pilot indicates activated state or deactivated state of the scheduled non-precoded pilot; and a sending module 1102, configured to send the acquired state information of the scheduled non-precoded pilot to a serving radio network controller SRNC, so that the SRNC sends, to a first user equipment UE, first 4Tx multi-input multi-output MIMO mode configuration signaling that carries the state information of the scheduled non-precoded pilot, and the first UE acquires state of the scheduled non-precoded pilot according to the state information of the scheduled non-precoded pilot when being configured to 4Tx MIMO mode.

In this embodiment of the present invention, optionally, the radio network controller further includes a receiving module 1101. The receiving module 1101 is configured to receive second 4Tx MIMO mode configuration signaling sent by the SRNC, and is configured to receive a response message of third 4Tx MIMO mode configuration signaling from the base station, where the response message of the third 4Tx MIMO mode configuration signaling includes the state information of the scheduled non-precoded pilot; and the sending module 1102 is specifically configured to send the third 4Tx MIMO mode configuration signaling to the base station, and is specifically configured to send a response message of the second 4Tx MIMO mode configuration signaling to the SRNC, where the response message of the second 4Tx MIMO mode configuration signaling includes the state information of the scheduled non-precoded pilot. The state information of the scheduled non-precoded pilot included in the response message of the second 4Tx MIMO mode configuration signaling is acquired by the acquiring module from the response message of the third 4Tx MIMO mode configuration signaling.

In this embodiment of the present invention, optionally, the receiving module 1101 is further configured to receive second 4Tx MIMO mode configuration signaling sent by the SRNC, and the sending module 1102 is specifically configured to send a response message of the second 4Tx MIMO mode configuration signaling to the SRNC, where the response message of the second 4Tx MIMO mode configuration signaling includes the state information of the scheduled non-precoded pilot, where the state information of the scheduled non-precoded pilot included in the response message is acquired by the acquiring module 1103 from state information that is of the scheduled non-precoded pilot and sent by the base station.

In this embodiment of the present invention, optionally, the receiving module 1101 is configured to: after the base station changes state of the scheduled non-precoded pilot, receive the state information of the scheduled non-precoded pilot from the base station, and the acquiring module 1103 acquires the state information of the scheduled non-precoded pilot from the state information of the scheduled non-precoded pilot received by the receiving module.

In this embodiment of the present invention, optionally, the receiving module 1101 is specifically configured to receive a resource state indication message that is sent by the base station and includes the state information of the scheduled non-precoded pilot.

In this embodiment of the present invention, optionally, the receiving module 1101 is specifically configured to receive a radio link setup message or a radio link addition message or a radio link reconfiguration request message or a radio link reconfiguration prepare message sent by the SRNC, where the second 4Tx MIMO mode configuration signaling is included in the radio link setup message or the radio link addition message or the radio link reconfiguration request message or the radio link reconfiguration prepare message.

In this embodiment of the present invention, optionally, the sending module 1102 is specifically configured to send a radio link setup response message or a radio link addition response message or a radio link reconfiguration response message or a radio link reconfiguration ready message to the SRNC, where the response message of the second 4Tx MIMO mode configuration signaling is included in the radio link setup response message or the radio link addition response message or the radio link reconfiguration response message or the radio link reconfiguration ready message.

The radio network controller according to this embodiment of the present invention may correspond to the DRNC in the method for indicating pilot state according to the foregoing embodiments of the present invention, and the foregoing and other operations and/or functions of each module in the SRNC are intended to separately implement corresponding processes of the methods in FIG. 11 to FIG. 13. For brevity, details are not repeatedly described herein.

Figure 24:
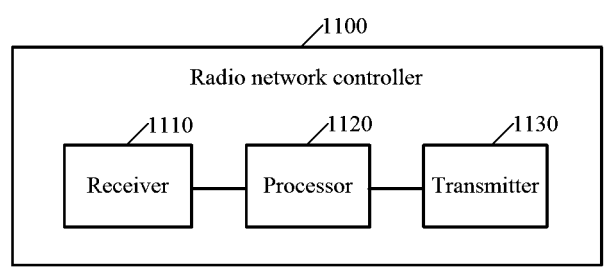
FIG. 24 is a schematic block diagram of a radio network controller according to still another embodiment of the present invention.

FIG. 24 is a schematic block diagram of a radio network controller 1100 according to still another embodiment of the present invention. As shown in FIG. 24, the radio network controller 1100 includes:

a processor 1120, configured to acquire state information of a scheduled non-precoded pilot and determine first 4Tx multi-input multi-output MIMO mode configuration signaling, where the state information of the scheduled non-precoded pilot indicates activated state or deactivated state of the scheduled non-precoded pilot, and the configuration signaling carries the state information of the scheduled non-precoded pilot; and a transmitter 1130, configured to send the first 4Tx multi-input multi-output MIMO mode configuration signaling to a user equipment UE, so that the UE acquires state of the scheduled non-precoded pilot according to the state information of the scheduled non-precoded pilot when being configured to 4Tx MIMO mode.

The radio network controller according to this embodiment of the present invention sends, to a UE, first 4Tx MIMO mode configuration signaling that carries state information of a scheduled non-precoded pilot, so that the UE may acquire state of the scheduled non-precoded pilot according to the state information of the scheduled non-precoded pilot when being configured to 4Tx MIMO mode, where the state information of the scheduled non-precoded pilot is acquired by the RNC. In this way, sending HS-SCCH signaling by a base station to notify the UE about state of the scheduled non-precoded pilot is avoided to reduce physical-layer signaling overheads and to reduce a delay in acquiring state of the scheduled non-precoded pilot by the UE in 4Tx MIMO mode.

In this embodiment of the present invention, optionally, the radio network controller 1100 further includes a receiver 1110. The receiver 1110 is configured to receive the state information of the scheduled non-precoded pilot from a base station; or, the receiver 1110 is configured to receive the state information of the scheduled non-precoded pilot from a drift radio network controller DRNC, where the state information of the scheduled non-precoded pilot is acquired by the DRNC from state information that is of a scheduled non-precoded pilot and sent by a base station; and the processor 1120 is specifically configured to acquire the state information of the scheduled non-precoded pilot from the state information of the scheduled non-precoded pilot received by the receiver.

In this embodiment of the present invention, optionally, the radio network controller 1100 further includes a receiver 1110. The transmitter 1130 is further configured to send second 4Tx MIMO mode configuration signaling to a base station. The receiver 1110 is configured to receive a response message of the second 4Tx MIMO mode configuration signaling from the base station, where the response message of the second 4Tx MIMO mode configuration signaling includes the state information of the scheduled non-precoded pilot. The processor 1120 is specifically configured to acquire the state information of the scheduled non-precoded pilot from the response message received by the receiver.

In this embodiment of the present invention, optionally, the radio network controller 1100 further includes a receiver 1110. The transmitter 1130 is further configured to send third 4Tx MIMO mode configuration signaling to a drift radio network controller DRNC, so that the DRNC sends second 4Tx MIMO mode configuration signaling to a base station. The receiver 1110 is configured to receive a response message of the second 4Tx MIMO mode configuration signaling from the DRNC, where the response message of the second 4Tx MIMO mode configuration signaling includes the state information of the scheduled non-precoded pilot, where the state information of the scheduled non-precoded pilot is acquired by the DRNC from a response message sent by the base station in response to the third 4Tx MIMO mode configuration signaling. The processor 1120 is specifically configured to acquire the state information of the scheduled non-precoded pilot from the response message received by the receiver.

In this embodiment of the present invention, optionally, the radio network controller 1100 further includes a receiver 1110. The transmitter 1130 is further configured to send second 4Tx MIMO mode configuration signaling to a drift radio network controller DRNC. The receiver 1110 is configured to receive a response message of the second 4Tx MIMO mode configuration signaling from the DRNC, where the response message of the second 4Tx MIMO mode configuration signaling includes the state information of the scheduled non-precoded pilot, where the state information of the scheduled non-precoded pilot is acquired by the DRNC from state information of the scheduled non-precoded pilot sent by a base station. The processor 1120 is specifically configured to acquire the state information of the scheduled non-precoded pilot from the response message received by the receiver.

In this embodiment of the present invention, optionally, the receiver 1110 is specifically configured to receive a resource state indication message sent by the base station, where the resource state indication message includes the state information of the scheduled non-precoded pilot. The processor 1120 is specifically configured to acquire the state information of the scheduled non-precoded pilot from the resource state indication message.

In this embodiment of the present invention, optionally, the receiver 1110 is specifically configured to: after the base station changes state of the scheduled non-precoded pilot, receive the state information of the scheduled non-precoded pilot from the base station.

In this embodiment of the present invention, optionally, the transmitter 1130 is specifically configured to send a radio link setup message or a radio link addition message or a radio link reconfiguration request message or a radio link reconfiguration prepare message to the DRNC, where the second 4Tx MIMO mode configuration signaling is included in the radio link setup message or the radio link addition message or the radio link reconfiguration request message or the radio link reconfiguration prepare message.

In this embodiment of the present invention, optionally, the receiver 1110 is specifically configured to receive a radio link setup response message or a radio link addition response message or a radio link reconfiguration response message or a radio link reconfiguration ready message sent by the DRNC. The response message of the second 4Tx MIMO mode configuration signaling is included in a radio link setup response message or a radio link addition response message or a radio link reconfiguration response message or a radio link reconfiguration ready message. The processor 1120 is specifically configured to acquire the state information of the scheduled non-precoded pilot from the radio link setup response message or the radio link addition response message or the radio link reconfiguration response message or the radio link reconfiguration ready message.

The radio network controller 1100 according to this embodiment of the present invention may correspond to the radio network controller in the method for indicating pilot state according to the foregoing embodiments of the present invention, and the foregoing and other operations and/or functions of each module in the radio network controller 1100 are intended to separately implement corresponding processes of the methods in FIG. 1 to FIG. 13. For brevity, details are not repeatedly described herein.

Figure 25:
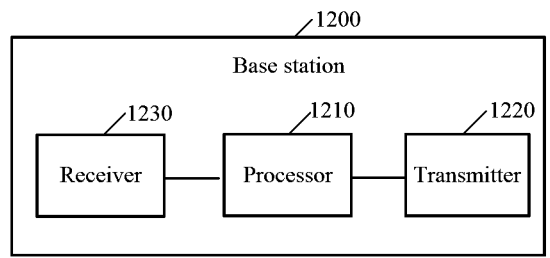
FIG. 25 is a schematic block diagram of a base station according to still another embodiment of the present invention.

FIG. 25 is a schematic block diagram of a base station 1200 according to still another embodiment of the present invention. As shown in FIG. 25, the base station 1200 includes:

a processor 1210, configured to determine state information of a scheduled non-precoded pilot, where the state information of the scheduled non-precoded pilot indicates activated state or deactivated state of the scheduled non-precoded pilot; and a transmitter 1220, configured to send the state information of the scheduled non-precoded pilot to a radio network controller RNC, so that the RNC sends, to a first user equipment UE, first 4Tx multi-input multi-output MIMO mode configuration signaling that carries the state information of the scheduled non-precoded pilot, and the first UE acquires state of the scheduled non-precoded pilot according to the state information of the scheduled non-precoded pilot when being configured to 4Tx MIMO mode.

The base station according to this embodiment of the present invention sends state information of a scheduled non-precoded pilot to an RNC, so that the RNC sends, to a UE, first 4Tx MIMO mode configuration signaling that carries the state information of the scheduled non-precoded pilot, and the UE acquires state of the scheduled non-precoded pilot according to the state information of the scheduled non-precoded pilot when being configured to 4Tx MIMO mode. In this way, sending HS-SCCH signaling by a base station to notify the UE about state of the scheduled non-precoded pilot is avoided to reduce physical-layer signaling overheads and to reduce a delay in acquiring state of the scheduled non-precoded pilot by the UE in 4Tx MIMO mode.

In this embodiment of the present invention, optionally, the RNC is a serving radio network controller SRNC. The transmitter 1220 is specifically configured to send the state information of the scheduled non-precoded pilot to the SRNC directly; or the transmitter 1220 is specifically configured to send the state information of the scheduled non-precoded pilot to the SRNC through a drift radio network controller DRNC.

In this embodiment of the present invention, optionally, the RNC is a serving radio network controller SRNC, and the base station further includes a receiver 1230. The receiver 1230 is configured to receive second 4Tx MIMO mode configuration signaling sent by the SRNC, and the transmitter 1220 is specifically configured to send a response message of the second 4Tx MIMO mode configuration signaling to the SRNC, where the response message includes the state information of the scheduled non-precoded pilot.

In this embodiment of the present invention, optionally, the RNC is a serving radio network controller SRNC, and the transmitter 1220 is specifically configured to send the state information of the scheduled non-precoded pilot to a drift radio network controller DRNC, so that after the DRNC receives second 4Tx MIMO mode configuration signaling sent by the SRNC, the DRNC sends a response message of the second 4Tx MIMO mode configuration signaling to the SRNC, where the response message includes the state information of the scheduled non-precoded pilot, and the state information of the scheduled non-precoded pilot included in the response message is acquired by the DRNC from the state information of the scheduled non-precoded pilot sent by the base station.

In this embodiment of the present invention, optionally, the RNC is a serving radio network controller SRNC, and the base station further includes a receiver 1230. The receiver 1230 is configured to receive third 4Tx MIMO mode configuration signaling sent by a drift radio network controller DRNC, where the third 4Tx MIMO mode configuration signaling is sent after the DRNC receives second 4Tx MIMO mode configuration signaling sent by the SRNC; and the transmitter 1220 is specifically configured to send a response message of the third 4Tx MIMO mode configuration signaling to the DRNC, so that the DRNC sends a response message of the second 4Tx MIMO mode configuration signaling to the SRNC, where both the response message of the second 4Tx MIMO mode configuration signaling and the response message of the third 4Tx MIMO mode configuration signaling include the state information of the scheduled non-precoded pilot, where the state information of the scheduled non-precoded pilot included in the response message of the second 4Tx MIMO mode configuration signaling is acquired by the DRNC from the response message of the third 4Tx MIMO mode configuration signaling.

In this embodiment of the present invention, optionally, the transmitter 1220 sends the state information of the scheduled non-precoded pilot to the RNC after the base station changes state of the scheduled non-precoded pilot.

In this embodiment of the present invention, optionally, the transmitter 1220 is specifically configured to send a resource state indication message, where the sent resource state indication message includes the state information of the scheduled non-precoded pilot.

In this embodiment of the present invention, optionally, the receiver 1230 is specifically configured to receive a radio link setup message or a radio link addition message or a radio link reconfiguration request message or a radio link reconfiguration prepare message, where the radio link setup message or the radio link addition message or the radio link reconfiguration request message or the radio link reconfiguration prepare message includes the second 4Tx MIMO mode configuration signaling.

In this embodiment of the present invention, optionally, the transmitter 1220 is further configured to: before the processor 1210 determines the state information of the scheduled non-precoded pilot, notify a second UE to change state of the scheduled non-precoded pilot, where the second UE is a UE that is already configured to 4Tx MIMO mode.

In this embodiment of the present invention, optionally, the transmitter 1220 is further configured to: after sending the state information of the scheduled non-precoded pilot to the radio network controller RNC and when current state of the scheduled non-precoded pilot is not consistent with the state of the scheduled non-precoded pilot acquired by the first UE according to the state information of the scheduled non-precoded pilot, notify the first UE to change state of the scheduled non-precoded pilot.

The base station 1200 according to this embodiment of the present invention may correspond to the base station in the method for indicating pilot state according to the foregoing embodiments of the present invention, and the foregoing and other operations and/or functions of each module in the base station 1200 are intended to separately implement corresponding processes of the methods in FIG. 1 to FIG. 13. For brevity, details are not repeatedly described herein.

Figure 26:
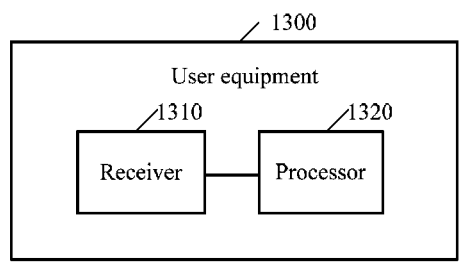
FIG. 26 is a schematic block diagram of a user equipment according to still another embodiment of the present invention.

FIG. 26 is a schematic block diagram of a user equipment 1300 according to still another embodiment of the present invention. As shown in FIG. 26, the user equipment 1300 includes:

a receiver 1310, configured to receive 4Tx multi-input multi-output MIMO mode configuration signaling sent by a radio network controller RNC, where the configuration signaling carries state information that is of a scheduled non-precoded pilot and acquired by the RNC, and the state information of the scheduled non-precoded pilot indicates activated state or deactivated state of the scheduled non-precoded pilot; and a processor 1320, configured to acquire state of the scheduled non-precoded pilot according to the state information of the scheduled non-precoded pilot when being configured to 4Tx MIMO mode according to the configuration signaling.

The user equipment according to this embodiment of the present invention receives 4Tx MIMO mode configuration signaling that is sent by an RNC and carries state information of a scheduled non-precoded pilot, and acquires state of the scheduled non-precoded pilot according to the state information of the scheduled non-precoded pilot when being configured to 4Tx MIMO mode. In this way, sending HS-SCCH signaling by a base station to notify the UE about state of the scheduled non-precoded pilot is avoided to reduce physical-layer signaling overheads and to reduce a delay in acquiring state of the scheduled non-precoded pilot by the UE in 4Tx MIMO mode.

In this embodiment of the present invention, optionally, the state information of the scheduled non-precoded pilot is sent after the base station changes state of the scheduled non-precoded pilot.

In this embodiment of the present invention, optionally, the receiver 1310 is further configured to: after the processor 1320 acquires state of the scheduled non-precoded pilot according to the state information of the scheduled non-precoded pilot, receive signaling for changing state of the scheduled non-precoded pilot from the base station, and the processor 1320 is further configured to change state of the scheduled non-precoded pilot according to the signaling for changing state of the scheduled non-precoded pilot, where the signaling for changing state of the scheduled non-precoded pilot is sent by the base station when current state of the scheduled non-precoded pilot is not consistent with the state of the scheduled non-precoded pilot acquired by the user equipment according to the state information of the scheduled non-precoded pilot.

The user equipment 1300 according to this embodiment of the present invention may correspond to the user equipment in the method for indicating pilot state according to the foregoing embodiments of the present invention, and the foregoing and other operations and/or functions of each module in the user equipment 1300 are intended to separately implement corresponding processes of the methods in FIG. 1 to FIG. 9. For brevity, details are not repeatedly described herein.

Figure 27:
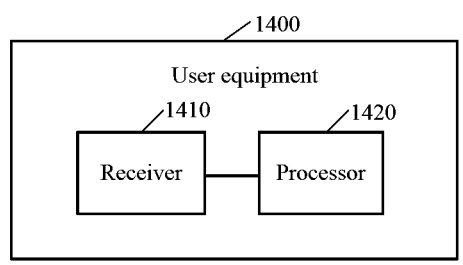
FIG. 27 is a schematic block diagram of a user equipment according to still another embodiment of the present invention.

FIG. 27 is a schematic block diagram of a user equipment 1400 according to still another embodiment of the present invention. As shown in FIG. 27, the user equipment 1400 includes:

a receiver 1410, configured to receive 4Tx multi-input multi-output MIMO mode configuration signaling sent by a radio network controller RNC; and a processor 1420, configured to: when being configured to 4Tx MIMO mode according to the configuration signaling, determine that state of a scheduled non-precoded pilot is deactivated.

When being configured to 4Tx MIMO mode, the user equipment according to this embodiment of the present invention determines that state of a scheduled non-precoded pilot is deactivated. In this way, there is a lower probability that a base station sends HS-SCCH signaling to notify the UE about state of the scheduled non-precoded pilot, which in turn reduces physical-layer signaling overheads and reduces a delay in acquiring state of the scheduled non-precoded pilot by the UE in 4Tx MIMO mode.

In this embodiment of the present invention, optionally, the receiver 1410 is further configured to: after the processor 1420 determines that state of the scheduled non-precoded pilot is deactivated, receive signaling for changing state of the scheduled non-precoded pilot from a base station; and the processor 1420 is further configured to change state of the scheduled non-precoded pilot to activated according to the signaling for changing state of the scheduled non-precoded pilot, where the signaling for changing state of the scheduled non-precoded pilot is sent when the base station determines that current state of the scheduled non-precoded pilot is activated.

The user equipment 1400 according to this embodiment of the present invention may correspond to the user equipment in the method for indicating pilot state according to the foregoing embodiments of the present invention, and the foregoing and other operations and/or functions of each module in the user equipment 1400 are intended to separately implement corresponding processes of the methods in FIG. 14 to FIG. 16. For brevity, details are not repeatedly described herein.

Figure 28:
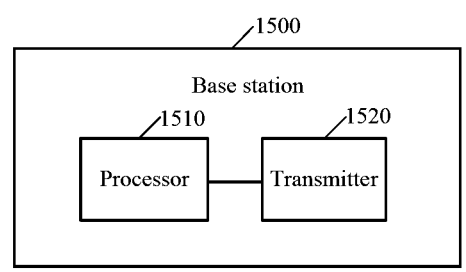
FIG. 28 is a schematic block diagram of a base station according to still another embodiment of the present invention.

FIG. 28 is a schematic block diagram of a base station 1500 according to still another embodiment of the present invention. As shown in FIG. 28, the base station 1500 includes:

a processor 1510, configured to: after a user equipment UE is configured to 4Tx MIMO mode and determines that state of a scheduled non-precoded pilot is deactivated, determine that current state of the scheduled non-precoded pilot is activated; and a transmitter 1520, configured to send signaling for changing state of the scheduled non-precoded pilot to the UE so that the UE changes state of the scheduled non-precoded pilot to be activated.

The base station 1500 according to this embodiment of the present invention may correspond to the base station in the method for indicating pilot state according to the foregoing embodiments of the present invention, and the foregoing and other operations and/or functions of each module in the base station 1500 are intended to separately implement corresponding processes of the methods in FIG. 14 to FIG. 16. For brevity, details are not repeatedly described herein.

Figure 29:
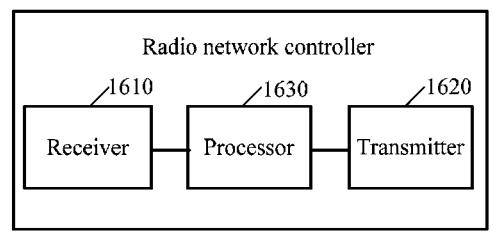
FIG. 29 is a schematic block diagram of a radio network controller according to another embodiment of the present invention.

FIG. 29 is a schematic block diagram of a radio network controller according to still another embodiment of the present invention. As shown in FIG. 29, the radio network controller includes: a processor 1630, configured to acquire state information of a scheduled non-precoded pilot from state information of the scheduled non-precoded pilot sent by a base station, where the acquired state information of the scheduled non-precoded pilot indicates activated state or deactivated state of the scheduled non-precoded pilot; and a transmitter 1620, configured to send the acquired state information of the scheduled non-precoded pilot to a serving radio network controller SRNC, so that the SRNC sends, to a first user equipment UE, first 4Tx multi-input multi-output MIMO mode configuration signaling that carries the state information of the scheduled non-precoded pilot, and the first UE acquires state of the scheduled non-precoded pilot according to the state information of the scheduled non-precoded pilot when being configured to 4Tx MIMO mode.

In this embodiment of the present invention, optionally, the radio network controller further includes a receiver 1610. The receiver 1610 is specifically configured to receive second 4Tx MIMO mode configuration signaling sent by the SRNC, and is specifically configured to receive a response message of third 4Tx MIMO mode configuration signaling from the base station, where the response message of the third 4Tx MIMO mode configuration signaling includes the state information of the scheduled non-precoded pilot; and the transmitter 1620 is specifically configured to send the third 4Tx MIMO mode configuration signaling to the base station, and is specifically configured to send a response message of the second 4Tx MIMO mode configuration signaling to the SRNC, where the response message of the second 4Tx MIMO mode configuration signaling includes the state information of the scheduled non-precoded pilot.

The state information of the scheduled non-precoded pilot included in the response message of the second 4Tx MIMO mode configuration signaling is acquired by the processor from the response message of the third 4Tx MIMO mode configuration signaling.

In this embodiment of the present invention, optionally, the receiver 1610 is further configured to receive second 4Tx MIMO mode configuration signaling sent by the SRNC. The transmitter 1620 is specifically configured to send a response message of the second 4Tx MIMO mode configuration signaling to the SRNC, where the response message of the second 4Tx MIMO mode configuration signaling includes the state information of the scheduled non-precoded pilot, where the state information of the scheduled non-precoded pilot included in the response message is acquired by the processor from state information that is of the scheduled non-precoded pilot and sent by the base station.

In this embodiment of the present invention, optionally, the receiver 1610 is specifically configured to: after the base station changes state of the scheduled non-precoded pilot, receive the state information that is of the scheduled non-precoded pilot and sent by the base station.

In this embodiment of the present invention, optionally, the receiver 1610 is specifically configured to receive a resource state indication message that is sent by the base station and includes the state information of the scheduled non-precoded pilot.

In this embodiment of the present invention, optionally, the receiver 1610 is specifically configured to receive a radio link setup message or a radio link addition message or a radio link reconfiguration request message or a radio link reconfiguration prepare message sent by the SRNC, where the second 4Tx MIMO mode configuration signaling is included in the radio link setup message or the radio link addition message or the radio link reconfiguration request message or the radio link reconfiguration prepare message.

In this embodiment of the present invention, optionally, the transmitter 1620 is specifically configured to send a radio link setup response message or a radio link addition response message or a radio link reconfiguration response message or a radio link reconfiguration ready message to the SRNC, where the response message of the second 4Tx MIMO mode configuration signaling is included in the radio link setup response message or the radio link addition response message or the radio link reconfiguration response message or the radio link reconfiguration ready message;

The radio network controller according to this embodiment of the present invention may correspond to the DRNC in the method for indicating pilot state according to the foregoing embodiments of the present invention, and the foregoing and other operations and/or functions of each module in the SRNC are intended to separately implement corresponding processes of the methods in FIG. 11 to FIG. 13. For brevity, details are not repeatedly described herein.

Still another embodiment of the present invention further provides a system, including a radio network controller shown in FIG. 18, a base station shown in FIG. 19, and a user equipment shown in FIG. 20.

Still another embodiment of the present invention further provides a system, including a radio network controller shown in FIG. 18 and FIG. 19, a base station shown in FIG. 19, and a user equipment shown in FIG. 20.

Still another embodiment of the present invention further provides a system, including a base station shown in FIG. 22 and a user equipment shown in FIG. 21.

Still another embodiment of the present invention further provides a system, including a radio network controller shown in FIG. 24, a base station shown in FIG. 25, and a user equipment shown in FIG. 26.

Still another embodiment of the present invention further provides a system, including a radio network controller shown in FIG. 24 and FIG. 29, a base station shown in FIG. 25, and a user equipment shown in FIG. 26.

Still another embodiment of the present invention further provides a system, including a base station shown in FIG. 28 and a user equipment shown in FIG. 27.

It should be understood that a system that includes a radio network controller, a base station, or a user equipment in the embodiments described above shall also fall within the protection scope of the present invention.

It should be understood that in the embodiments of the present invention, the term "and/or" is only an association relationship for describing associated objects, and represents that three relationships may exist. For example, "A and/or B" may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for indicating a pilot state, comprising:
acquiring, by a radio network controller (RNC), state information of a scheduled non-precoded pilot, wherein the state information of the scheduled non-precoded pilot indicates an activated state or a deactivated state of the scheduled non-precoded pilot; and
sending, by the RNC, first 4Tx multi-input multi-output (MIMO) mode configuration signaling to a user equipment (UE), wherein the first 4Tx MIMO mode configuration signaling carries the state information of the scheduled non-precoded pilot, wherein the UE acquires a state of the scheduled non-precoded pilot according to the state information of the scheduled non-precoded pilot when being configured to 4Tx MIMO mode;
wherein the RNC is a serving radio network controller (SRNC), and the acquiring, by the RNC the state information of the scheduled non-precoded pilot comprises:
receiving, by the SRNC, the state information of the scheduled non-precoded pilot from a base station; or,
receiving, by the SRNC, the state information of the scheduled non-precoded pilot from a drift radio network controller (DRNC), wherein the state information of the scheduled non-precoded pilot is acquired by the DRNC from state information of the scheduled non-precoded pilot sent by a base station.

2. The method according to claim 1, wherein the state information of the scheduled non-precoded pilot sent by the base station is comprised in a resource state indication message sent by the base station.

3. The method according to claim 2, wherein the state information of the scheduled non-precoded pilot sent by the base station is state information of the scheduled non-precoded pilot sent after the base station changes a state of the scheduled non-precoded pilot.

4. A radio network controller, comprising:
a processor, configured to acquire state information of a scheduled non-precoded pilot and determine first 4Tx multi-input multi-output (MIMO) mode configuration signaling, wherein the state information of the scheduled non-precoded pilot indicates an activated state or a deactivated state of the scheduled non-precoded pilot, and the configuration signaling carries the state information of the scheduled non-precoded pilot;
a transmitter, configured to send the first 4Tx multi-input multi-output (MIMO) mode configuration signaling to a user equipment (UE), wherein the UE acquires a state of the scheduled non-precoded pilot according to the state information of the scheduled non-precoded pilot when being configured to a 4Tx MIMO mode; and
a receiver configured to:
receive the state information of the scheduled non-precoded pilot from a base station; or,
receive the state information of the scheduled non-precoded pilot from a drift radio network controller (DRNC) wherein the state information of the scheduled non-precoded pilot is acquired by the DRNC from state information of the scheduled non-precoded pilot sent by a base station;
wherein the processor is configured to acquire the state information of the scheduled non-precoded pilot from the state information of the scheduled non-precoded pilot received by the receiver.

5. The radio network controller according to claim 4, wherein the receiver is further configured to receive a resource state indication message sent by the base station, wherein the resource state indication message comprises the state information of the scheduled non-precoded pilot; and
the processor is further configured to acquire the state information of the scheduled non-precoded pilot from the resource state indication message.

6. The radio network controller according to claim 5, wherein the receiver is further configured to:
after the base station changes a state of the scheduled non-precoded pilot, receive the state information of the scheduled non-precoded pilot from the base station.

7. A system for indicating a pilot state, comprising:
a base station; and
a radio network controller, comprising:
a processor, configured to acquire state information of a scheduled non-precoded pilot and determine first 4Tx multi-input multi-output (MIMO) mode configuration signaling, wherein the state information of the scheduled non-precoded pilot indicates an activated state or a deactivated state of the scheduled non-precoded pilot, and the configuration signaling carries the state information of the scheduled non-precoded pilot;
a transmitter, configured to send the first 4Tx multi-input multi-output (MIMO) mode configuration signaling to a user equipment (UE), so that the UE acquires state of the scheduled non-precoded pilot according to the state information of the scheduled non-precoded pilot when being configured to 4Tx MIMO mode; and
a receiver, configured to:
receive the state information of the scheduled non-precoded pilot from the base station; or,
receive the state information of the scheduled non-precoded pilot from a drift radio network controller (DRNC), wherein the state information of the scheduled non-precoded pilot is acquired by the DRNC from state information of the scheduled non-precoded pilot sent by the base station; and wherein the processor is configured to acquire the state information of the scheduled non-precoded pilot from the state information of the scheduled non-precoded pilot received by the receiver.

8. The system according to claim 7, wherein:

the receiver is configured to receive a resource state indication message sent by the base station, wherein the resource state indication message comprises the state information of the scheduled non-precoded pilot; and the processor is configured to acquire the state information of the scheduled non-precoded pilot from the resource state indication message.

9. The system according to claim 8, wherein the receiver is configured to:

after the base station changes a state of the scheduled non-precoded pilot, receive the state information of the scheduled non-precoded pilot from the base station.

* * * * *